US012637211B2

(12) United States Patent
Beno et al.

(10) Patent No.: US 12,637,211 B2
(45) Date of Patent: *May 26, 2026

(54) REDUNDANT LOAD PATH FOR A TILTABLE AIRCRAFT COMPONENT

(71) Applicant: Archer Aviation Inc., San Jose, CA (US)

(72) Inventors: Jonathan Anthony Beno, Bellevue, WA (US); Benjamin Scott Dyer, Huntsville, AL (US); Nathan Daniel Storrs, Woodinville, WA (US)

(73) Assignee: Archer Aviation Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/917,053

(22) Filed: Oct. 16, 2024

(65) Prior Publication Data

US 2025/0066028 A1 Feb. 27, 2025

Related U.S. Application Data

(63) Continuation of application No. PCT/US2023/075801, filed on Oct. 3, 2023, which is
(Continued)

(51) Int. Cl.
 *B64C 29/00* (2006.01)
 *B60L 15/06* (2006.01)
 (Continued)

(52) U.S. Cl.
 CPC .......... *B64C 29/0033* (2013.01); *B60L 15/06* (2013.01); *B60L 15/38* (2013.01);
 (Continued)

(58) Field of Classification Search
 CPC .................................................. B64C 29/0033
 See application file for complete search history.

(56) References Cited

U.S. PATENT DOCUMENTS 3,039,719 A * 6/1962 Platt .................... B64C 29/0033
                                                    244/12.4
5,280,863 A 1/1994 Schmittle
 (Continued)

FOREIGN PATENT DOCUMENTS

CA 3060742 A1 4/2021
DE 1039846 B 10/1957
 (Continued)

OTHER PUBLICATIONS

Muscarello, Vincenzo et al., "Wing-Pilot Vertical Bounce in Tiltrotors," Journal of Guidance Control and Dynamics, Apr. 2, 2018, p. 1731-1743, vol. 41, No. 8.
 (Continued)

*Primary Examiner* — William L Gmoser
(74) *Attorney, Agent, or Firm* — Finnegan, Henderson, Farabow, Garrett & Dunner, LLP

(57) ABSTRACT

A tilting apparatus for an aircraft, comprising: a tiltable aircraft component which tilts between a first and second position, at least one actuator for adjusting a tilt angle of the tiltable aircraft component, and at least one passive damper connected to the tiltable aircraft component and configured to limit a rate of change of the tilt angle of the tiltable aircraft component. The at least one passive damper is on a load path separate from a load path of the at least one actuator.

30 Claims, 29 Drawing Sheets

Related U.S. Application Data a continuation of application No. 18/296,062, filed on Apr. 5, 2023, now Pat. No. 12,122,525.

(60) Provisional application No. 63/378,536, filed on Oct. 6, 2022.

(51) Int. Cl.

| | |
|---|---|
| *B60L 15/38* | (2006.01) |
| *B64C 27/54* | (2006.01) |
| *B64D 27/30* | (2024.01) |
| *B64D 33/08* | (2006.01) |
| *B64D 35/02* | (2024.01) |
| *F16B 2/06* | (2006.01) |
| *F16H 57/08* | (2006.01) |
| *H02K 1/27* | (2022.01) |
| *H02K 1/32* | (2006.01) |
| *H02K 5/124* | (2006.01) |
| *H02K 5/20* | (2006.01) |
| *H02K 7/08* | (2006.01) |
| *H02K 7/116* | (2006.01) |
| *H02K 9/19* | (2006.01) |
| *H02K 11/33* | (2016.01) |
| *H02K 15/03* | (2025.01) |
| *H02M 7/5395* | (2006.01) |
| *H02P 21/00* | (2016.01) |
| *H02P 25/16* | (2006.01) |
| *H02P 27/06* | (2006.01) |
| *H02P 27/08* | (2006.01) |
| *H02K 7/00* | (2006.01) |

(52) U.S. Cl.
CPC .......... *B64C 27/54* (2013.01); *B64C 29/0008* (2013.01); *B64D 27/30* (2024.01); *B64D 33/08* (2013.01); *B64D 35/02* (2013.01); *F16B 2/06* (2013.01); *F16H 57/08* (2013.01); *H02K 1/27* (2013.01); *H02K 1/32* (2013.01); *H02K 5/124* (2013.01); *H02K 5/203* (2021.01); *H02K 7/08* (2013.01); *H02K 7/116* (2013.01); *H02K 9/19* (2013.01); *H02K 11/33* (2016.01); *H02K 15/03* (2013.01); *H02M 7/5395* (2013.01); *H02P 21/50* (2016.02); *H02P 25/16* (2013.01); *H02P 27/06* (2013.01); *H02P 27/08* (2013.01); *B60L 2200/10* (2013.01); *B60L 2210/40* (2013.01); *H02K 7/006* (2013.01)

(56) References Cited

U.S. PATENT DOCUMENTS

| | | | | |
|---|---|---|---|---|
| 5,839,691 | A | * | 11/1998 | Lariviere ............. B64C 27/605 |
| | | | | 244/17.23 |
| 5,863,013 | A | * | 1/1999 | Schmittle ............... B64U 30/10 |
| | | | | 244/38 |
| 6,220,545 | B1 | | 4/2001 | Fenny et al. |
| 6,247,667 | B1 | | 6/2001 | Fenny et al. |
| 6,382,556 | B1 | * | 5/2002 | Pham .................. B64C 29/0033 |
| | | | | 244/6 |
| 7,070,145 | B2 | | 7/2006 | Baldwin |
| 8,038,394 | B2 | | 10/2011 | Stille et al. |
| 9,573,676 | B2 | | 2/2017 | Dyckrup et al. |
| 9,764,829 | B1 | * | 9/2017 | Beckman ........... B64C 29/0033 |
| 10,173,771 | B2 | | 1/2019 | Ivans et al. |
| 10,648,529 | B2 | | 5/2020 | Heverly, II |
| 10,676,186 | B2 | | 6/2020 | Alber |
| 10,800,521 | B1 | | 10/2020 | Grenier et al. |
| 11,530,028 | B1 | * | 12/2022 | Wiegman ................ B64C 13/22 |
| 2006/0032971 | A1 | | 2/2006 | Baldwin |
| 2016/0083075 | A1 | | 3/2016 | Moxon |
| 2016/0288903 | A1 | | 10/2016 | Rothhaar et al. |
| 2017/0197712 | A1 | * | 7/2017 | Alber .................. B64C 29/0033 |
| 2020/0031488 | A1 | * | 1/2020 | King ...................... B64C 3/187 |
| 2020/0207467 | A1 | | 7/2020 | Morgan |
| 2020/0391860 | A1 | | 12/2020 | Foskey et al. |
| 2021/0253239 | A1 | | 8/2021 | Ivans et al. |
| 2021/0403154 | A1 | | 12/2021 | Tighe et al. |
| 2022/0177124 | A1 | | 6/2022 | Marshall et al. |

FOREIGN PATENT DOCUMENTS

| | | | |
|---|---|---|---|
| FR | 2830237 | A1 | 4/2003 |
| JP | 6537000 | B1 | 7/2019 |
| WO | 2021236576 | A1 | 11/2021 |

OTHER PUBLICATIONS

Nixon, Mark W., et al., "Tiltrotor Vibration Reduction Through Higher Harmonic Control," American Helicopter Society 53rd Annual Forum, 24 pages, Apr. 29, 1997.

White G: "V-22 Nacelle Conversion Actuator", Proceedings of the Institution of Mechanical Engineers. Part E.Journal of Process Mechanical Engineering, Mechanical Engineering Publications, London, GB, vol. 207, No. G0I, Jan. 1993, pp. 61-72,XP000964772, ISSN: 0954-4089.

PCT International Search Report and Written Opinion for corresponding application PCT/US2023/075801, mailed Jan. 4, 2024.

* cited by examiner

REDUNDANT LOAD PATH FOR A TILTABLE AIRCRAFT COMPONENT

CROSS-REFERENCE TO RELATED APPLICATIONS

This application claims priority to and the benefit of PCT Application PCT/US2023/075801, filed Oct. 3, 2023, titled "Redundant Load Path for Powered Lift Tilt Actuator" which in turn claims priority to U.S. Provisional Application No. 63/378,536, filed Oct. 6, 2022, and U.S. Provisional Application No. 63/378,680, filed Oct. 7, 2022, and U.S. application Ser. No. 18/296,062, filed Apr. 5, 2023. The entire contents of the aforementioned applications are incorporated by reference herein for all purposes.

FIELD

The present disclosure relates generally to aircraft, and more specifically, to aircraft with tiltable proprotors.

BACKGROUND

Vertical take-off and landing (VTOL) aircraft are aircraft that can take-off and land vertically and hover. To take-off and land vertically and hover, VTOL aircraft can include one or more proprotors that can be tilted between a position for providing vertical thrust for take-off and landing and hover and a position for providing forward thrust for forward flight. VTOL aircraft can include wings like conventional fixed-wing aircraft that provide lift during forward flight to which the tiltable proprotors may be mounted. Because the tiltable proprotors control the performance of the aircraft in flight, they must be designed to avoid catastrophic failure. This can often include introducing redundant actuators for controlling the tilt of the proprotors such that if one actuator fails, another takes over, and/or overdesigning aircraft structural components so that a particular failure mode is not catastrophic. However, redundant actuators and overdesigned components introduce additional undesirable weight that can increase the manufacturing cost and operational cost of the aircraft.

SUMMARY

Secondary load paths comprising passive dampers for actuated tiltable proprotors of an aircraft are disclosed herein that are configured to dampen high velocity tilting of the tiltable proprotor in the event an actuator that tilts the tiltable proprotor becomes disconnected from the tiltable proprotor. A shaft of an actuator used to tilt the tiltable proprotor can be a single point of failure that may experience relatively high load. Breakage of the shaft may result in uncontrolled tilting of the proprotor that, under load, can lead to high rotational velocities and high support structure impact velocities resulting in catastrophic failure. The passive dampers described herein are configured to dampen the rotational velocities of the tiltable components in the case of actuator disconnection, thus preventing catastrophic failure without requiring redundancy and support structure overdesign.

In some examples, the dampers configured to dampen high velocity tilting of the tiltable proprotor as described herein may include a balanced hydraulic or pneumatic cylinder (a "balanced uncharged damper"). The balanced uncharged damper cylinders may include a piston that slides within the cylinder of the damper, the piston including a plurality of apertures through which damping fluid flows while the piston moves through the cylinder. A piston rod connected to the piston of the damper can be rotatably connected to the tiltable proprotor such that as the proprotor tilts toward either the lift or forward flight configuration, the damper applies a force in the opposite direction of the tiltable proprotor's rotation. The force is the result of a resistance of the damping fluid applied against damper piston as it moves through the fluid. Thus, the damper dissipates energy (e.g., by converting kinetic energy to heat) as the piston moves through the damping fluid due to the resistance of the damping oil as applied to the piston. In some examples, the dampers may include unbalanced cylinders (an "unbalanced damper"). The unbalanced dampers similarly include a piston that slides within the cylinder and includes a plurality of apertures through which damping fluid flows while the piston moves through the cylinder but can also include pressurized gas within the cylinder in addition to the damping fluid. When a force exerted on the damper piston, the pressurized gas can compress or expand, depending on the direction of the force. As such, the pressurized gas can absorb an initial sudden force exerted on the damper piston.

According to an aspect, a tiltable proprotor of an aircraft that is tiltable between a lift position and a forward flight position is connected to a secondary load path including a passive damper, such as the balanced uncharged damper or unbalanced damper described above. In the lift position, the tiltable proprotor is configured to provide lift for the aircraft, for instance, during vertical take-off. In the forward flight position, the tiltable proprotor is configured to provide forward propulsion for the aircraft. The aircraft can include an actuator connected to the tiltable proprotor for adjusting the tilt angle of the tiltable proprotor between the lift position and the forward flight position. As described above, due to the high loads experienced by the actuator shaft, the shaft can break, thus resulting in a free-floating tiltable proprotor, which can lead to catastrophic failure of the aircraft. As such, the aircraft disclosed herein are provided with at least one passive damper connected to the tiltable proprotor and configured to limit a rate of change of the tilt angle of the tiltable proprotor.

An exemplary aircraft is provided, the aircraft including: a tiltable proprotor that is tiltable between a lift position for providing lift for the aircraft and a forward flight position for providing forward propulsion for the aircraft; at least one actuator for adjusting a tilt angle of the tiltable proprotor; and at least one passive damper connected to the tiltable proprotor and configured to limit a rate of change of the tilt angle of the tiltable proprotor.

In some examples of the aircraft, the at least one passive damper includes a hydraulic or pneumatic cylinder.

In some examples of the aircraft, wherein the hydraulic or pneumatic cylinder is a balanced uncharged cylinder or an unbalanced cylinder.

In some examples of the aircraft, the at least one passive damper is configured to limit the rate of change of the tilt angle of the tiltable proprotor in both tilt directions.

In some examples of the aircraft, the at least one actuator comprises a linear actuator.

In some examples of the aircraft, the at least one actuator comprises a rotary actuator.

In some examples of the aircraft, the aircraft includes a boom, wherein the tiltable proprotor is tiltably mounted to the boom.

In some examples of the aircraft, the aircraft includes a fixed rotor mounted to the boom in a fixed position for providing lift.

In some examples of the aircraft, the tiltable proprotor is mounted to a forward end of the boom and the fixed rotor is mounted to an aft end of the boom.

In some examples of the aircraft, the boom includes an outer shell and the at least one passive damper is at least partially housed within the outer shell.

In some examples of the aircraft, the boom includes a rib, and the at least one actuator and the at least one passive damper are positioned on opposite sides of the rib.

In some examples of the aircraft, the boom is mounted to a wing of the aircraft inward of an end of the wing.

In some examples of the aircraft, the tiltable proprotor is configured to tilt in an upward direction from the forward flight position to the lift position, and a force vector of the at least one passive damper extends beneath a tilt axis of the tiltable proprotor.

In some examples of the aircraft, the aircraft includes a plurality of tiltable proprotors and a plurality of passive dampers for the plurality of tiltable proprotors.

In some examples of the aircraft, a range of the tilt angle of the tiltable proprotor is at least 90 degrees.

In some examples of the aircraft, the aircraft includes a single actuator for adjusting the tilt angle of the tiltable proprotor.

In some examples of the aircraft, the at least one passive damper is configured to limit the rate of change of the tilt angle to a predetermined threshold value in an event in which the tiltable proprotor is disconnected from the at least one actuator during forward flight.

In some examples of the aircraft, the tiltable proprotor is electrically powered.

In some examples of the aircraft, the aircraft is a passenger aircraft.

An exemplary method is provided for controlling an aircraft, the method including: receiving a command at a controller to adjust a tilt angle of a tiltable proprotor that is tiltable between a lift position for providing lift for the aircraft and a forward flight position for providing forward propulsion for the aircraft; and controlling at least one actuator to adjust the tilt angle of the tiltable proprotor according to the command, wherein at least one passive damper is connected to the tiltable proprotor to limit a rate of change of the tilt angle of the tiltable proprotor. The method may be performed using any of the above aircraft.

It will be appreciated that any of the variations, aspects, features, and options described in view of the systems apply equally to the methods and vice versa. It will also be clear that any one or more of the above variations, aspects, features, and options can be combined.

BRIEF DESCRIPTION OF THE DRAWINGS

The invention will now be described, by way of example only, with reference to the accompanying drawings, in which.

DETAILED DESCRIPTION

Figure 1:
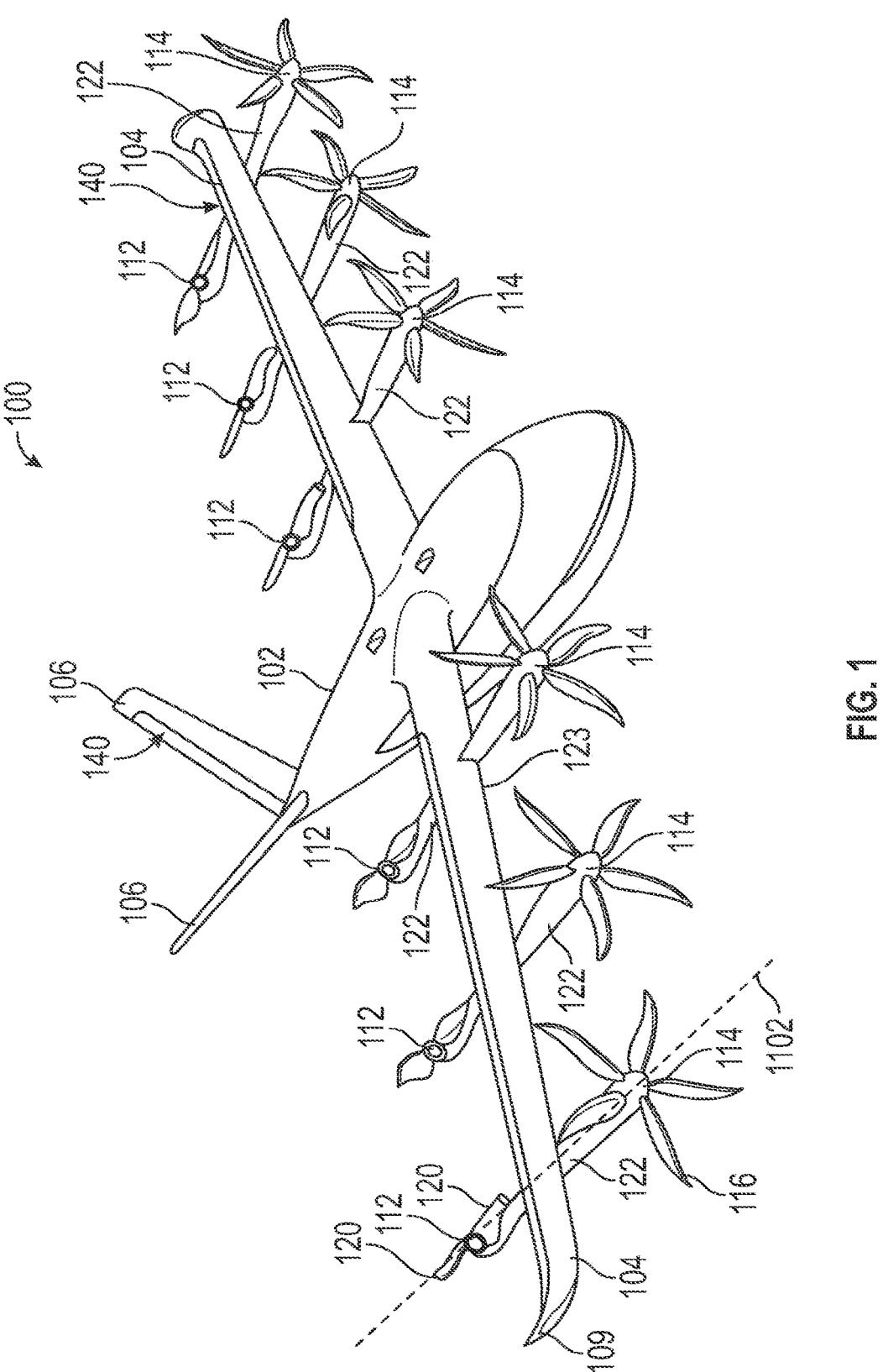
FIG. 1 shows an aircraft in a forward flight configuration, according to one or more examples of the disclosure.

In the following description of the various examples, reference is made to the accompanying drawings, in which are shown, by way of illustration, specific examples that can be practiced. The description is presented to enable one of ordinary skill in the art to make and use the invention and is provided in the context of a patent application and its requirements. Various modifications to the described examples will be readily apparent to those persons skilled in the art and the generic principles herein may be applied to other examples. Thus, the present invention is not intended to be limited to the examples shown but is to be accorded the widest scope consistent with the principles and features described herein.

Described herein are systems, devices, and methods for dampening high velocity tilting of aircraft tiltable proprotors using a passive damper connected between a tiltable proprotor and a support structure of the aircraft. Uncontrolled movement tiltable proprotors in the event of actuator disconnection (e.g., a disconnection of a connecting portion of the actuator from the rest of the actuator by a break in the actuator shaft) poses a risk of catastrophic failure. Breakage of an actuator shaft may result in uncontrolled tilting of the tiltable proprotor that, under load, can lead to high rotational velocities and thus high support structure impact velocities resulting in catastrophic failure of the aircraft.

To mitigate such risk, aircraft may be designed with redundant components, such as redundant actuators, and/or with overdesigned components that can withstand the uncontrolled motion, both of which add weight and cost to the aircraft design and increase operational cost. A secondary load path that includes a passive damper, according to the principles herein, can eliminate the need for redundant actuators and/or overdesign of aircraft structural components to mitigate uncontrolled movement of tiltable proprotors by dampening high velocity tilting of the tiltable proprotor in the event that an actuator that controls the tilting of the tiltable proprotor becomes disconnected from the tiltable proprotor, as described further below.

A tiltable proprotor of an aircraft that is tiltable between a lift position and a forward flight position can be connected to the passive damper as described above according to various examples. In the lift position, the tiltable proprotors are configured to provide lift for the aircraft, for instance, during takeoff. In the forward flight position, the tiltable proprotors are configured to provide forward propulsion for the aircraft. To adjust the angle of the tiltable proprotors (e.g., between the lift and forward flight positions), the aircraft can include an actuator between each tiltable proprotor and a structure of the aircraft, such as a boom. Due to the high loads experienced by the actuator shaft, a failure mode that must be considered in the aircraft design is a breakage in the actuator shaft that could result in a free-floating component (the tiltable proprotor), which can in turn lead to catastrophic failure of the aircraft resulting from high velocity impact of the tiltable proprotor against aircraft structural components. For that reason, the aircraft disclosed herein are provided with at least one passive damper connected to each tiltable proprotor and configured to limit a rate of change of the tilt angle of the tiltable proprotor.

The passive dampers described herein may include a balanced hydraulic or pneumatic cylinder (a "balanced uncharged damper"). The balanced uncharged damper cylinders may include a piston that slides within the cylinder and includes a plurality of apertures through which damping fluid flows while the piston moves through the cylinder. The piston can be attached to a piston rod that extends from the cylinder and can be rotatably attached to a tiltable proprotor of the aircraft. As the tiltable proprotor rotates either toward a lift or forward flight position, it will exert a tensile or compressive force, respectively, on the piston rod, either urging the piston rod away from the piston cylinder or toward the piston cylinder. In turn the piston will be forced to slide within the cylinder as the proprotor tilts in either direction. As such, the damper dissipates (e.g., by converting kinetic energy to heat) energy as the piston moves through the damping fluid due to the resistance of the damping fluid as applied to the piston.

In some examples, the passive dampers may include unbalanced cylinders (an "unbalanced damper"). The unbalanced dampers similarly include a piston that slides within the cylinder and includes a plurality of apertures through which damping fluid flows while the piston moves through the cylinder, but can also include pressurized gas within the cylinder in addition to the damping fluid. When a force exerted on the damper piston, the pressurized gas can compress or expand, depending on the direction of the force. As such, the pressurized gas can absorb an initial sudden force exerted on the damper piston. Thus, if the actuator shaft breaks, the passive damper (either the balanced uncharged damper or the unbalanced damper) dampens high velocity tilting of the tiltable proprotor, thereby preventing catastrophic failure.

Thus, the systems, devices, and methods described herein provide for a more cost-efficient aircraft design and reduced weight of the overall aircraft while satisfying safety requirements. Additionally, a passive damper requires no activation, engagement, or other control to perform its function of controlling the rate of change of tilt of the tiltable components. As such, it provides a reliable and simple solution to the actuator disconnect failure mode described herein.

As used herein, the singular forms "a," "an," and "the" used in the following description are intended to include the plural forms as well unless the context clearly indicates otherwise. It is to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

As used herein, the term "proprotor" refers to a variable tilt propeller in which the direction of thrust of the propeller can be changed by changing the tilt angle of the propeller. For example, the tilt angle can be changed from an angle that provides at least some degree of vertical thrust, such as for vertical take-off and landing, to an angle that provides at least some degree of horizontal thrust, such as for forward flight. As used herein, a proprotor lift configuration refers to any proprotor orientation in which the proprotor thrust is providing primarily lift to the aircraft and proprotor forward flight configuration refers to any proprotor orientation in which the proprotor thrust is providing primarily forward thrust to the aircraft.

As used herein, "vertical take-off and landing" ("VTOL") refers to the capability of an aircraft to move substantially vertically without lift being provided solely by wings of the aircraft. While this term encompasses directly vertical take-off and landing (i.e., vertical movement without any horizontal movement), it also encompasses vertical movement in combination with horizontal movement. It will be understood by a person having ordinary skill in the art that a VTOL aircraft may be capable of non-vertical take-off and landing. For example, a winged VTOL, such as various examples described herein, can take-off and land in a traditional airplane manner utilizing the lift provided by its wings at suitable airspeeds.

FIG. 1 shows an aircraft 100 in a forward flight configuration. The aircraft 100 includes a fuselage 102, wings 104 mounted to the fuselage 102, and one or more rear stabilizers 106 mounted to the rear of the fuselage 102. The aircraft 100 can be a vertical take-off and landing (VTOL) aircraft, and may be a passenger aircraft. A plurality of rotors 112 are mounted to the wings 104 and are configured to provide lift, such as for take-off and landing. A plurality of proprotors 114 are mounted to the wings 104 and are tiltable between lift configurations in which they provide a portion of the lift required for vertical take-off and landing and hovering, and forward flight configurations (as shown in FIG. 1) in which they provide forward thrust to the aircraft 100 for horizontal flight.

During take-off and landing, the proprotors 114 are tilted to lift configurations in which their thrust is directed upward for providing lift. For forward flight, the proprotors 114 tilt from their lift configurations to their forward flight configurations in which their thrust is directed forward for providing forward propulsion. In other words, the pitch of the proprotors 114 is varied from a tilt angle in which the proprotor provides lift for take-off and landing (and, optionally, hover) to a tilt angle in which the proprotor provides forward thrust to the aircraft 100 for forward flight. The proprotors 114 can each be tilted by one or more actuators. The actuator(s) can be electrically powered. Optionally, each proprotor has a single actuator for adjusting its tilt. According to various embodiments, the aircraft 100 can include one or more damper mechanisms connected to each tiltable proprotor configured to limit a rate of change of the tilt angle of the tiltable proprotor, such as in the event that the actuator becomes disconnected or otherwise fails.

When the aircraft 100 is in full forward flight, lift may be provided entirely by the wings 104, and the rotors 112 may be shut-off. The blades 120 of the rotors 112 may be locked in low drags positions for aircraft cruising. In some embodiments, the rotors 112 each have two blades 120 that are locked in minimum drag positions for cruising in which one blade is directly in front of the other blade as illustrated in FIG. 1. In some embodiments, the rotors 112 have more than two blades. In some embodiments, the proprotors 114 include more blades 116 than the rotors 112. For example, as illustrated in FIG. 1, the rotors 112 may each include two blades and the proprotors 114 may each include five blades. According to various embodiments, the proprotors 114 can have from 2 to 5 blades.

According to various embodiments, the aircraft includes only one wing 104 on each side of the fuselage 102 (or a single wing that extends across the entire aircraft) and at least a portion of the rotors 112 are located rearward of the wings 104 and at least a portion of the proprotors 114 are located forward of the wings 104. In some embodiments, all of the rotors 112 are located rearward of the wings 104 and all of the proprotors are located forward of the wings 104.

According to some embodiments, all rotors 112 and proprotors 114 are mounted to the wings i.e., no rotors or proprotors are mounted to the fuselage. According to various embodiments, the rotors 112 are all located rearwardly of the wings 104 and the proprotors 114 are all located forward of the wings 104. According to some embodiments, all rotors 112 and proprotors 114 are positioned inwardly of the wing tips 109.

According to various embodiments, the rotors 112 and proprotors 114 are mounted to the wings 104 by booms 122. The booms 122 may be mounted beneath the wings 104, on top of the wings, and/or may be integrated into the wing profile. According to various embodiments, one rotor 112 and one proprotor 114 are mounted to each boom 122. The rotor 112 may be mounted at a rear end of the boom 122 and a proprotor 114 may be mounted at a front end of the boom 122. In some embodiments, the rotor 112 is mounted in a fixed position on the boom 122. In some embodiments, the proprotor 114 is mounted to a front end of the boom 122 via a hinge or other system. The proprotor 114 may be mounted to the boom 122 such that the proprotor 114 is aligned with the body of the boom 122 when in its forward flight configuration, forming a continuous extension of the front end of the boom 122 that minimizes drag for forward flight.

The aircraft is operated during take-off and landing by positioning the proprotors in lift configurations and providing the required lift to the aircraft via the combined lift provided by the rotors and proprotors. According to various embodiments, during take-off and landing and/or hover, the proprotors can be maintained in predetermined lift configurations that can be the same across all proprotors or different for different proprotors. According to various embodiments, the tilt of at least some of the proprotors can be actively adjusted during take-off and landing and/or hover to provide the required stability and/or maneuvering. As discussed further below, the pitches of the blades of the proprotors (also referred to herein as the pitch angle and angle of attack) are mechanically linked to the tilt of the proprotors such that the blade pitch is coordinated with the proprotor tilt, such as to achieve maximum thrust when the proprotor is in the lift configuration and to achieve increased efficiency when the proprotor is in the forward flight configuration.

According to various embodiments, each rotor and/or each proprotor can be individually controlled by the flight controller according to the various operational degrees of freedom. According to various embodiments, the only degree of freedom of the rotor is the rotational speed of the rotor. According to various embodiments, the degrees of freedom of at least a portion of the proprotors includes the rotational speed of the proprotors, and the degree of tilt of the proprotors (combined with the blade pitch of the proprotors). According to various embodiments, any of these degrees of freedom can be actively controlled by the flight controller (either autonomously or in response to pilot commands) during take-off and landing in order to provide the appropriate stability and maneuvering.

Once the aircraft has achieved sufficient altitude to commence forward flight, the proprotors begin tilting forward toward their forward flight configurations such that their thrust provides a combination of lift and thrust, with a decreasing proportion of lift as the proprotors are tilted further toward their forward flight configurations. The pitch angle of the blades can be adjusted as the proprotors tilt forward toward their forward flight configurations. For instance, in the forward flight configuration, the blades of the proprotor can be at a pitch angle that results in less drag relative to a pitch angle of the blades when in the lift configuration. The rotors can remain active during at least a portion of the period in which the proprotors are tilted forward to continue to provide rotor-based lift. At any point after the forward airspeed is high enough that the wings provide sufficient lift to maintain the aircraft's altitude, the rotors can be deactivated.

The tilt of at least some of the proprotors can be actively controlled to provide additional stability and/or maneuverability control during cruising. In some embodiments, the tilt of at least some of the proprotors is actively controlled during take-off and landing and/or hover. In some embodiments, the tilt of the proprotors is fixed (i.e., non-varying) during cruise. According to some embodiments, the tilt of the outermost proprotors can be actively and independently controlled during vertical take-off and landing and/or hover to provide yawing moments as needed. The range of tilt angle of the tiltable proprotor(s) is at least 90 degrees, such that the proprotors can tilt between the forward flight configuration and the lift configuration.

Figure 2:
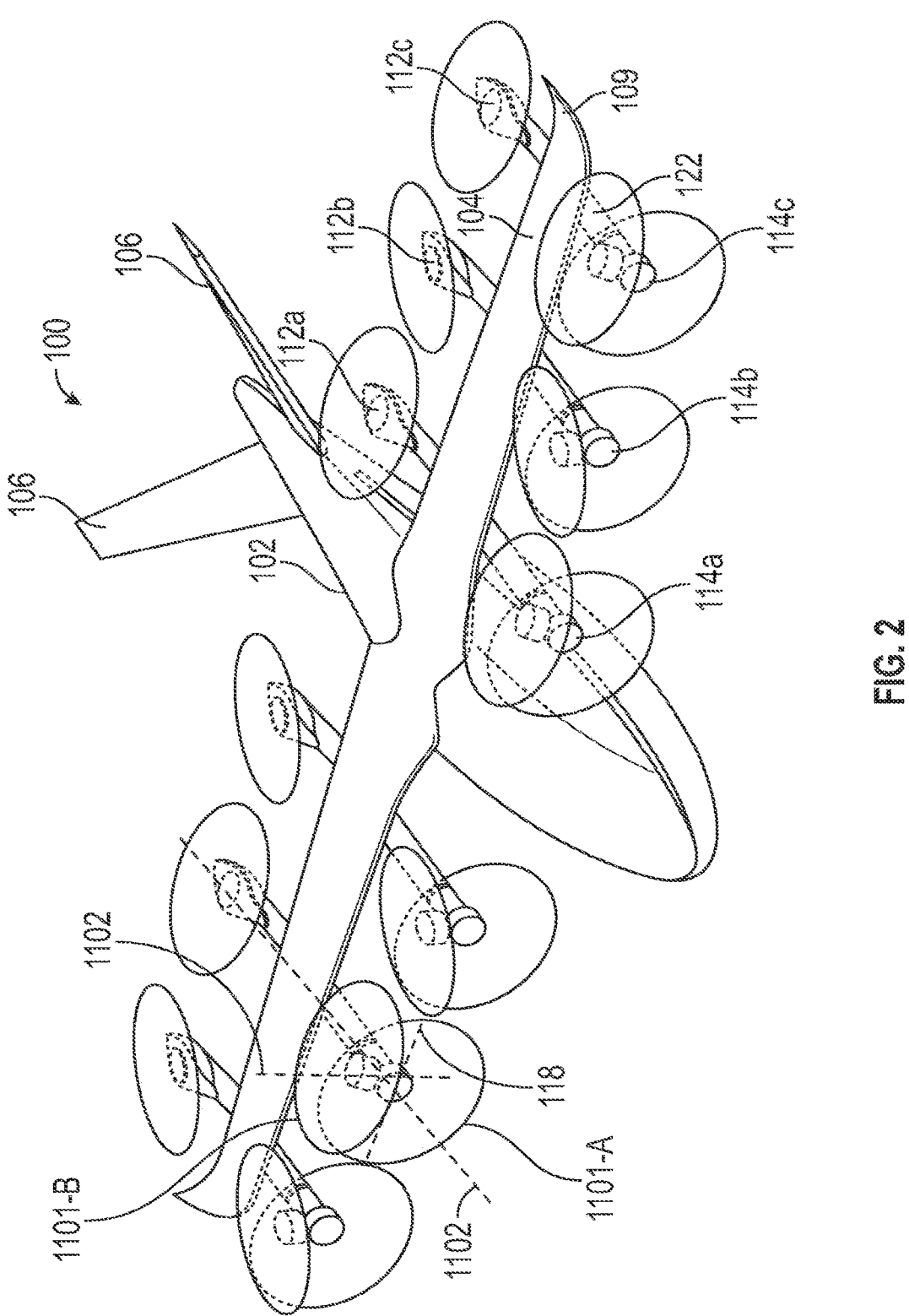
FIG. 2 is a perspective view of the aircraft of FIG. 1 illustrating the proprotor positions in the lift and forward flight configurations, according to one or more examples of the disclosure.

FIG. 2 is a perspective view of the aircraft 100 of FIG. 1 illustrating the proprotor positions in the lift and forward flight configurations, according to one or more examples of the disclosure. The proprotors 114 can tilt about the tilt axis 118 that is perpendicular to the forward direction of the aircraft. For forward flight, the proprotors tilt from the lift configuration, which provides vertical thrust, to a forward flight configuration, which provides forward thrust.

As described further below, the aircraft 100 can include a system to tilt the proprotors 114 between the lift configuration and the forward flight configuration. The system can mechanically link adjustment of the pitch angle of the blades of the proprotor 114 to the adjustment of the tilt of the proprotors 114.

Figure 3:
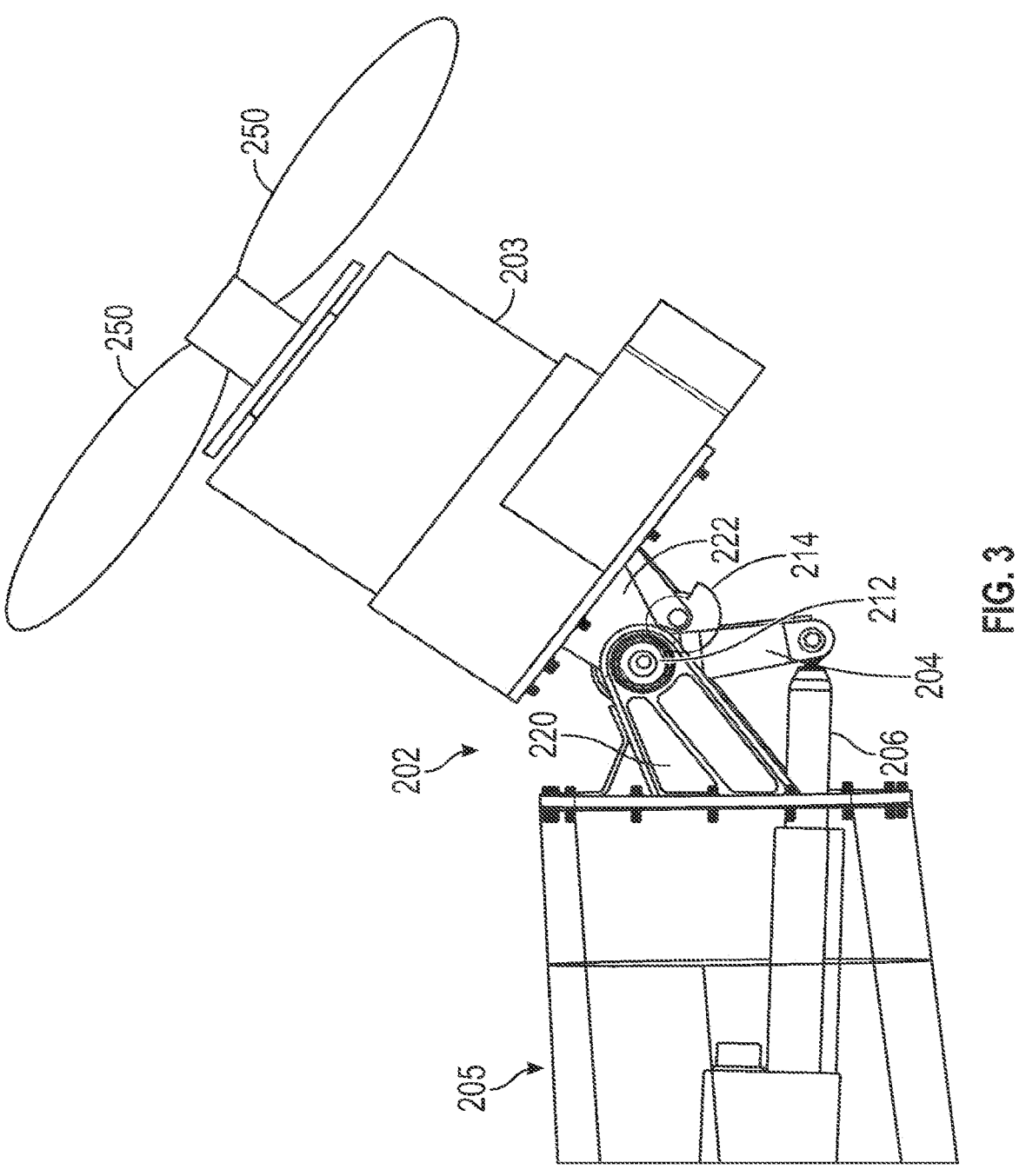
FIG. 3 shows a side view of a portion of an aircraft with an exemplary system, according to one or more examples of the disclosure.

FIG. 3 illustrates an exemplary system 202 for coupling tilting a proprotor with adjusting the pitch angle of blades of the proprotor. The system 202 is configured such that the pitch angle of the blades of the proprotor can correspond with the tilt position of the proprotor without requiring independent systems for tilting the proprotor and adjusting the pitch angle of the blades. Accordingly, the system 202 reduces the complexity and cost of the aircraft.

The system 202 rotatably couples a proprotor 203 to a boom 205 of an aircraft, proprotor 114 to boom 122 of aircraft 100. The system 202 can include a fixed frame 220 for mounting to the aircraft (e.g., the proprotor 203 can be connected to a boom 205 via a bracket 236 of the fixed frame 220) and a proprotor frame 222 to which the proprotor 203 mounts. The proprotor frame 222 can be tiltably connected to the fixed frame 220 at a joint 212.

The system 202 can include one or more arm(s) 204 connected to the proprotor frame 222. A linear actuator 206 can be connected to the arm(s) 204 tilt the proprotor 203 about the joint 213. The actuator 206 can be, for example, a ball screw actuator or a pneumatic actuator. Alternatively, rotary actuator, such as a stepper motor or a servomotor, can be mounted at the joint or can drive a gear train that has an output gear located at the joint or engaged with a gear located at the joint.

The system 202 can include a cam 214 that can rotate in correspondence with tilting of the proprotor 203. A control rod (discussed further below) can be operatively coupled with the cam 214 such that the control rod can translate when the cam 214 rotates. The control rod is coupled at its opposite end to the blades 250 of the proprotor 203 such that translation of the control rod adjusts the pitch angle of the blades 250 of the proprotor 203. Accordingly, the system 202 couples the pitch angle of the blades 250 of the proprotor 203 to the tilt of the proprotor 203. During operation, a control system of the aircraft can send a proprotor tilt adjustment command to the actuator 206. The actuator 206 may extend or retracted, causing the proprotor to increase or decrease its degree of tilt. As the proprotor tilt changes, the cam 214 rotates. This, in turn, can cause the control rod to translate, which adjusts the pitch of the blades 250.

Figure 4:
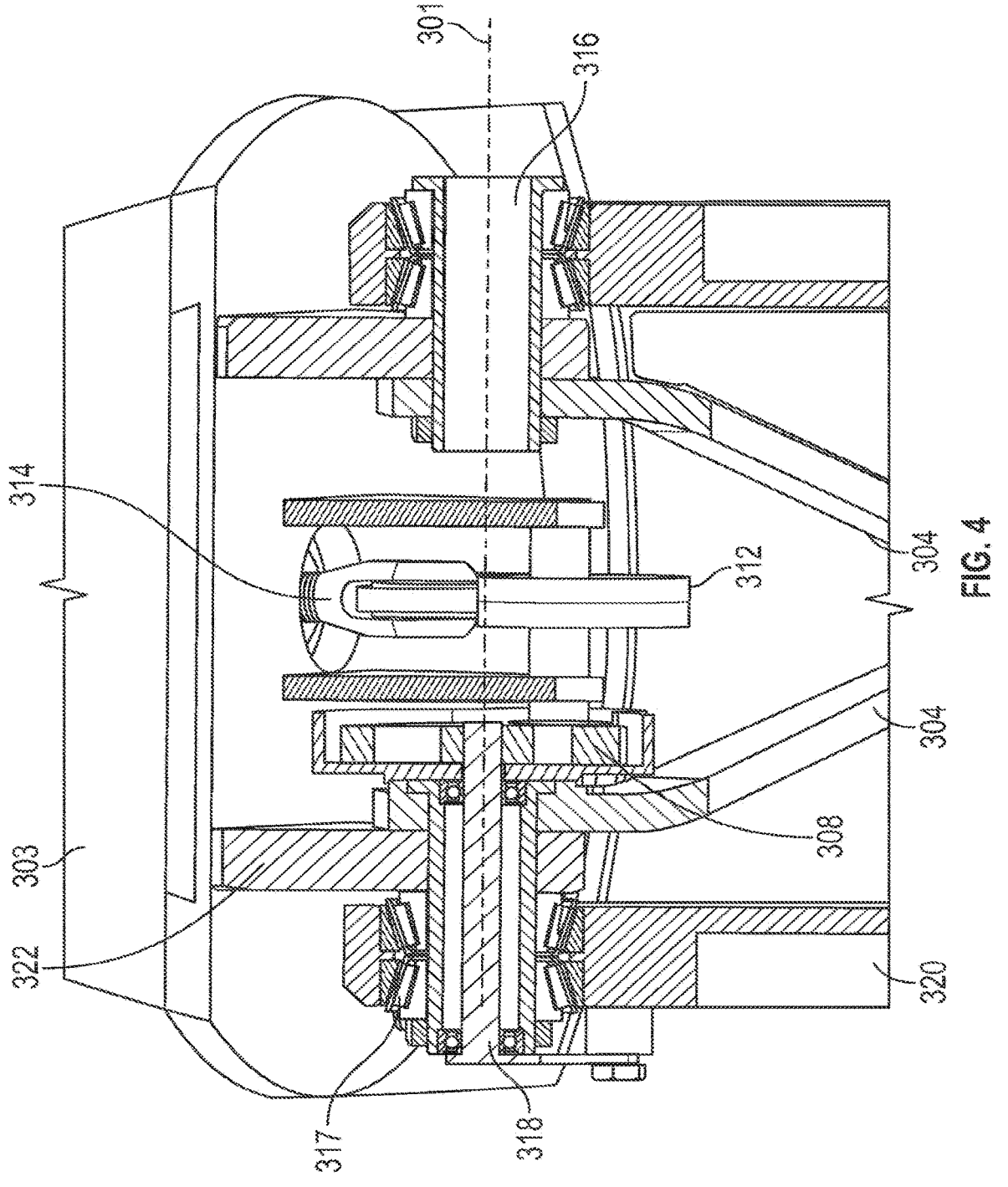
FIG. 4 shows a detail view of an exemplary system, according to one or more examples of the disclosure.

FIG. 4 shows a detail view of an exemplary system 302 for mechanically linking tilting a proprotor of an aircraft between a vertical thrust position and a forward thrust position with adjusting the pitch angle of blades of the proprotor. The system 302 can be used for system 202 of FIG. 3. The system 302 can include a fixed frame 320 for mounting to a portion of a VTOL aircraft (such as to the fuselage, wing, or a boom structure), and a proprotor frame 322 for mounting the proprotor 303 that is rotatably mounted to the fixed frame 320 at a rotation axis 301. In one or more examples, the system 302 includes a gear 308, a pinion (not shown in figure), a cam 312, a control rod 314, and a pair of arms 304.

As shown in FIG. 4, the gear 308 is located along the rotation axis 301. The gear 308 can be fixed in position relative to the fixed frame 320. For instance, as shown in FIG. 4, the gear 308 is connected to an internal pin 318 that attaches to the fixed frame 320. One or more of the shafts 316 can surround an internal pin 318, which is shown clearly by the cutaway view of the left shaft 316 of FIG. 4. A set of bearings 317 is located between each shaft 316 and the fixed frame 320 such that the shafts 316 are rotatably mounted to the fixed frame 320.

The proximal end of the arms 304 can engage with the proprotor frame 322. The engagement between the arms 304 and the proprotor frame 322 can be a fixed connection, such as by bolting or welding the arms 304 to the proprotor frame 322. Optionally, both the arms 304 and the proprotor frame 322 can be fixedly connected to the shafts 316. The distal end of the arms 304 can connect to one or more actuators 306 (see FIG. 5) that drive the arms 304 to rotate about the rotation axis 301. As the actuator 306 drives the arms 304, the proprotor 303 is rotated about the rotation axis 301.

Figure 5:
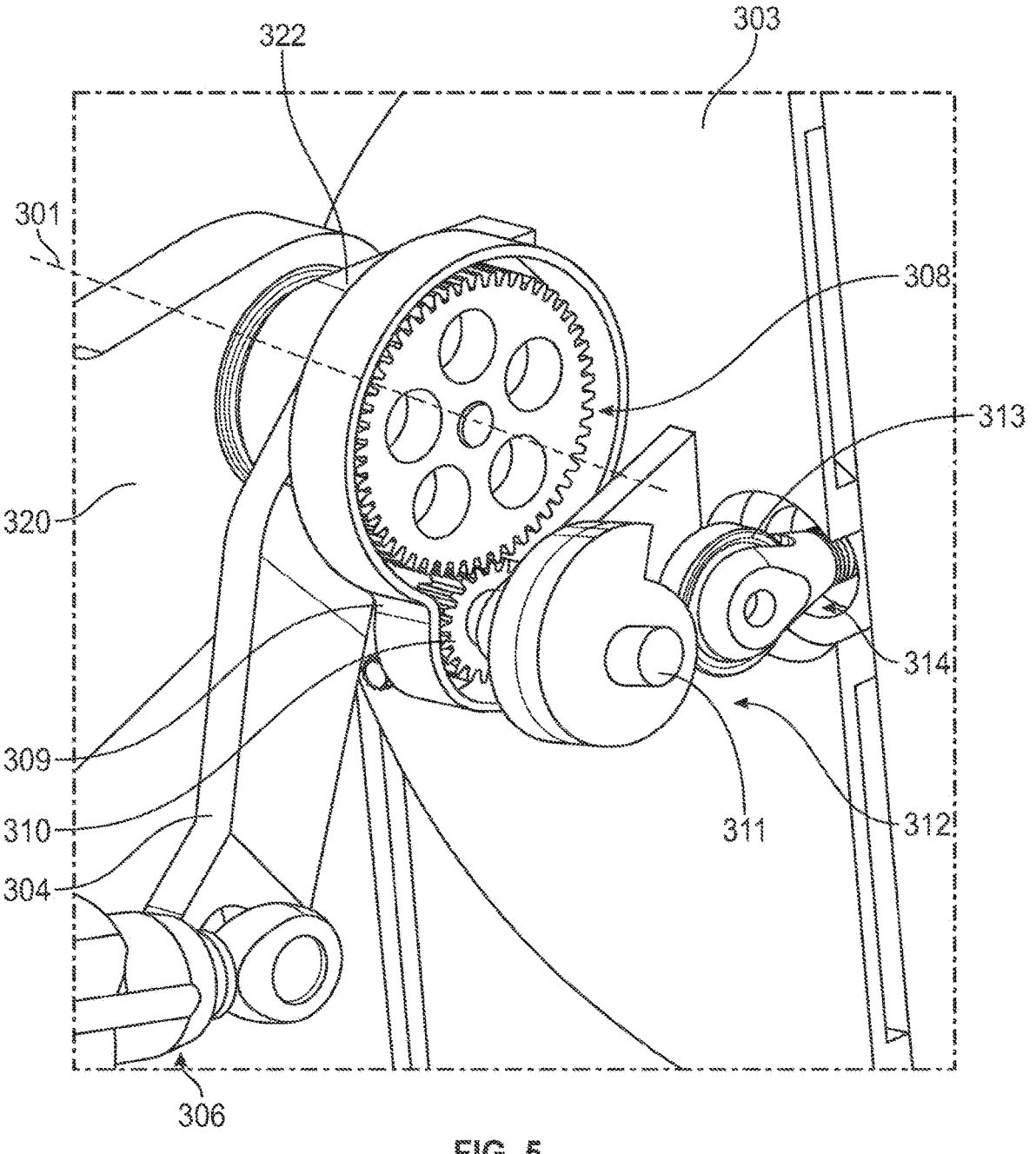
FIG. 5 shows a detail view of a portion of the exemplary system of FIG. 4, according to one or more examples of the disclosure.

The engagement between the gear 308, pinion, cam 312 and control rod 314 is shown more clearly in FIG. 5, which shows a detail view of a portion of the exemplary system 302 of FIG. 4. The pinion 310 is mounted within pinion housing 309, which is coupled in a fixed position to the arm 304 and/or the proprotor frame 322. Accordingly, the pinion 310 is rotationally coupled to the proprotor frame 322 such that the pinion 310 moves with the proprotor frame 322 (e.g., as the proprotor frame 322 and proprotor 303 rotate about the rotation axis 301). The pinion 310 is also engaged with the gear 308. Rotation of the pinion housing 309 drives the pinion 310 around at least a portion of the gear 308, which causes the pinion 310 to rotate via the toothed engagement with the gear 308.

The cam 312 is fixedly connected to the pinion 310, such as via the internal pin 311, such that the cam 312 rotates with the pinion 310. The cam 312 is also operatively coupled to a first end of the control rod 314, such that the control rod 314 translates relative to the internal pin 311 during at least a portion of the rotation of the cam 312. The control rod 314 is coupled at a second end to the blades of the proprotor (as will be described below) such that translation of the control rod 314 adjusts the pitch angle of the blades.

As the proprotor frame 322 rotates about the rotation axis 301 (e.g., to tilt the proprotor 303), the pinion 310 revolves around the gear 308, which rotates the cam 312 and translates the control rod 314, thereby adjusting the pitch angle of the blades of the proprotor 303. Accordingly, the system 302 mechanically links tilting the proprotor 303 with adjusting the pitch angle of the blades of the proprotor 303.

The control rod 314 can be engaged with the cam 312 via a follower that follows the cam 312 as the cam 312 rotates. The follower can be, for example, a roller or a pin. As shown in FIG. 5, the control rod 314 engages the cam 312 via a roller 313. The roller 313 travels along the outer surface of the cam 312 as the cam 312 rotates. To remain engaged with the outer surface of the cam 312, the control rod 314 can be biased in compression against the cam 312, such as via a spring (not shown in figure).

The cam profile (e.g., shape of its outer surface that the control rod follows) controls the position of the control rod. The profile of the cam 312 can include one or more portions that cause translation of the control rod 314 and can include one or more portions do not cause the control rod 314 to translate. For example, the cam 312 can have one or more spiral portions that cause translation of the control rod 314 and/or one or more circular portions that do not cause the control rod 314 to translate. In the example shown in FIG. 5, the cam 312 includes a spiral profile that will cause the control rod 314 to continuously translate throughout the range of tilt of the proprotor.

Figure 6:
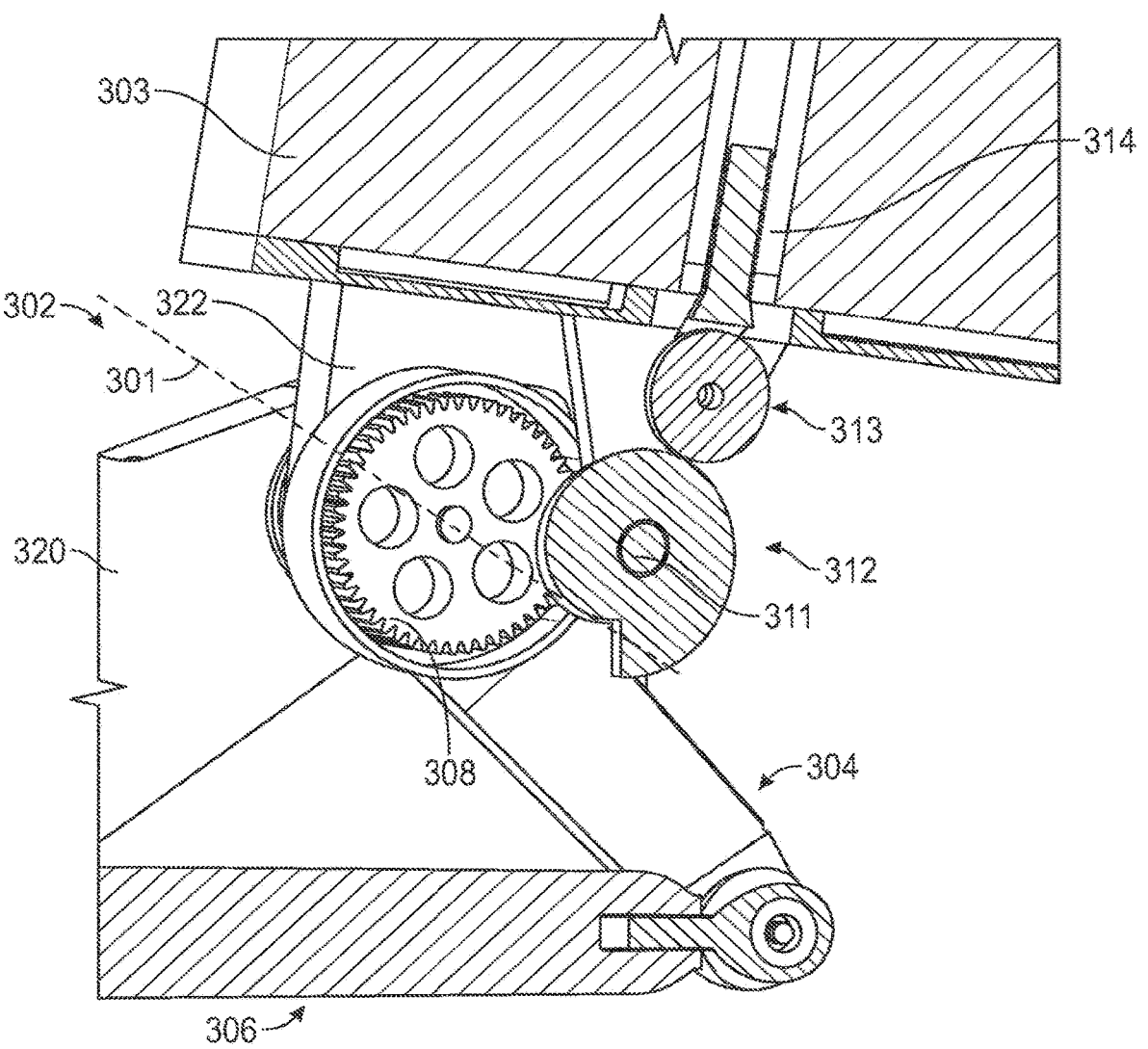
FIG. 6 shows another detail view of a portion of the exemplary system of FIG. 4, according to one or more examples of the disclosure.

FIG. 6 shows another detail view of a portion of the exemplary system 302 of FIGS. 4 and 5. Whereas FIG. 5 depicts the control rod 314 engaged with two sides of the outer surface of the cam 312 (e.g., in the corner area of the snail-shaped cam), FIG. 6 depicts the control rod 314 engaged with only one side of the outer surface of the cam 312. The position of the control rod 314 depicted in FIG. 6 compared to that of the control rod of FIG. 5 can be obtained by rotating the cam 312 in a clockwise direction such that the roller 313 moves in a counterclockwise direction as it follows the surface of the cam 312.

As the roller 313 follows the spiral portion of the cam 312, the control rod 314 may translate toward or away from the internal pin 311 at the center of the cam 312. For instance, if the cam 312 rotates in a clockwise direction, as the roller 313 follows the spiral portion of the cam 312, the control rod 314 translates away from the internal pin 311. Opposite, if the cam 312 rotates in a counter-clockwise direction, the control rod 314 can translate towards the internal pin 311 as the roller 313 follows the spiral portion of the cam 312. As the roller 313 follows the circular portion of the cam 312, the control rod 314 may remain at a constant distance and not translate relative to the internal pin 311. For example, the cam 312 can include a spiral profile for the first 210 degrees of rotation, with a circular profile for the remaining 150 degrees of rotation, such that the control rod 314 only translates away from the internal pin 311 during the first 210 degrees of rotation of the cam 312. As noted above, the control rod 314 can be biased in compression against the cam 312 via a spring 315.

Figure 7:
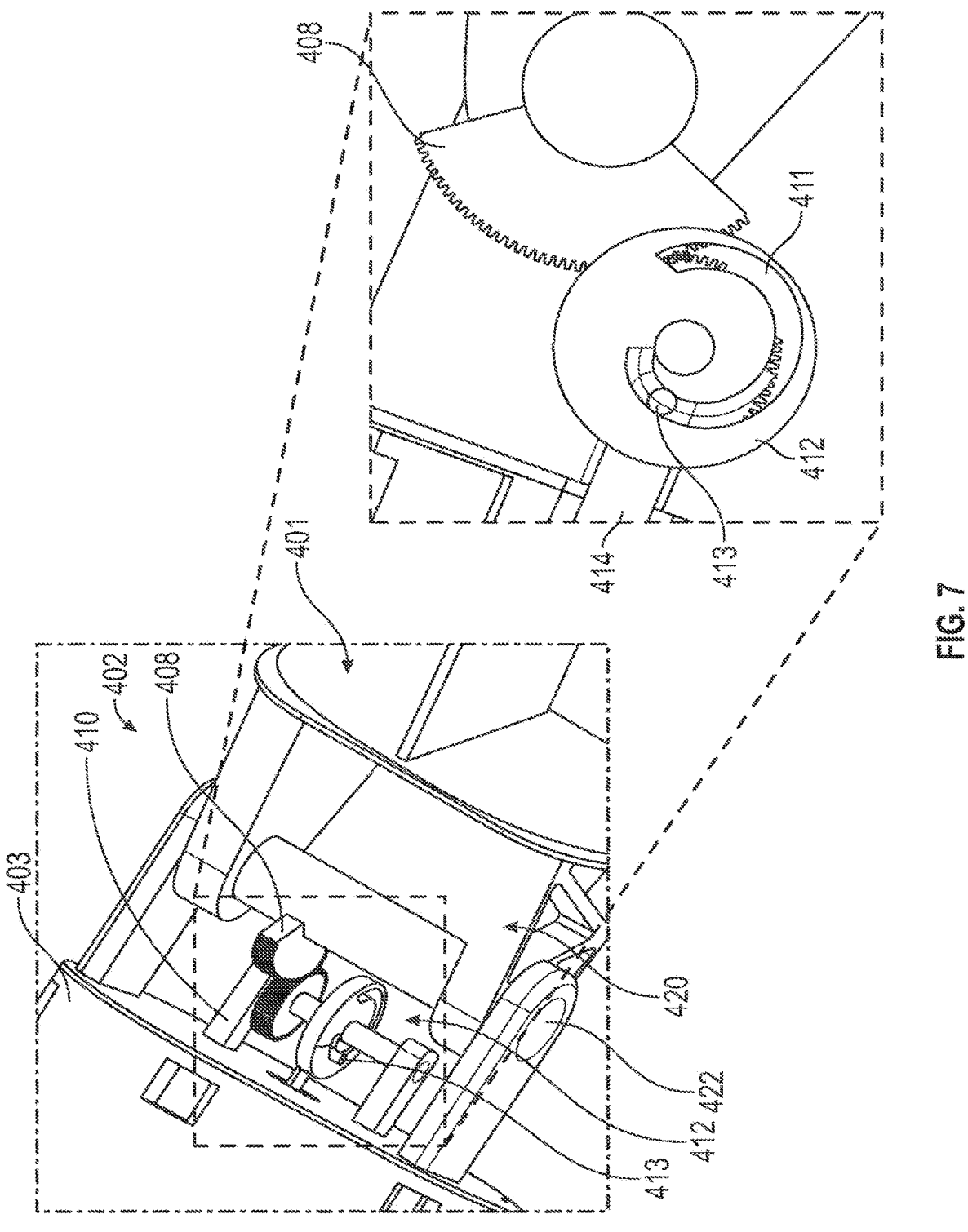
FIG. 7 shows a top perspective view and a detail view of an exemplary system, according to one or more examples of the disclosure.

FIG. 6 shows an example where the control rod 314 has a roller 313 engaged with an outer surface of the cam 312. Alternate configurations may have a different engagement between the control rod and cam. For instance, FIG. 7 shows a top perspective view of an exemplary system 402 that includes a control rod 414 with a pin 413 engaged with a track 411 of a cam 412. The pin 413 engages the track 411 of the cam 412 such that the cam 412 can both push and pull the pin 413 and the control rod as the cam 412 rotates.

The system 402 can be used for system 202 of FIG. 3. Similar to the systems discussed above, the system 402 connects a proprotor 403 to a portion of an aircraft (to a boom 401 as shown in FIG. 7). Distinct from the systems above, however, the system 402 includes a control rod 414 with a pin 413 that rides in a track. This configuration is more clearly visible the detailed pop-out of the cam 412, which shows the pin 413 of the control rod 414 engage with the track 411 in the cam 412. As the cam 412 rotates, such as by engagement with the pinion 410 rotating as it revolves around the gear 408, the pin 413 can follow the track 411, thereby translating the control rod 414.

The gear 408 can be fixed in position relative to the fixed frame 420, which is fixedly mounted to the aircraft. For instance, as shown in FIG. 7, the gear 408 is connected to the fixed frame 420. The pinion 410 can be rotatably mounted to the fixed frame 420, such that the pinion 410 is rotationally coupled to the proprotor frame 422 and moves with the proprotor frame 422.

The track 411 can include a spiral portion and a circular portion. As the pin 413 follows spiral portion of the track 411, the control rod 414 can translate toward or away from a center of the cam 412. As the pin 413 follows a circular section of the track 411, however, the control rod 414 can remain at a constant distance and not translate relative to the center of the cam 412. Optionally, the track 411 of the cam 412 can be a variety of geometries, based on the type of translation desired. To remain engaged with the track 411, the control rod 414 can be biased in compression or tension against the cam 312, such as via a spring (not shown in figure).

Figure 8:
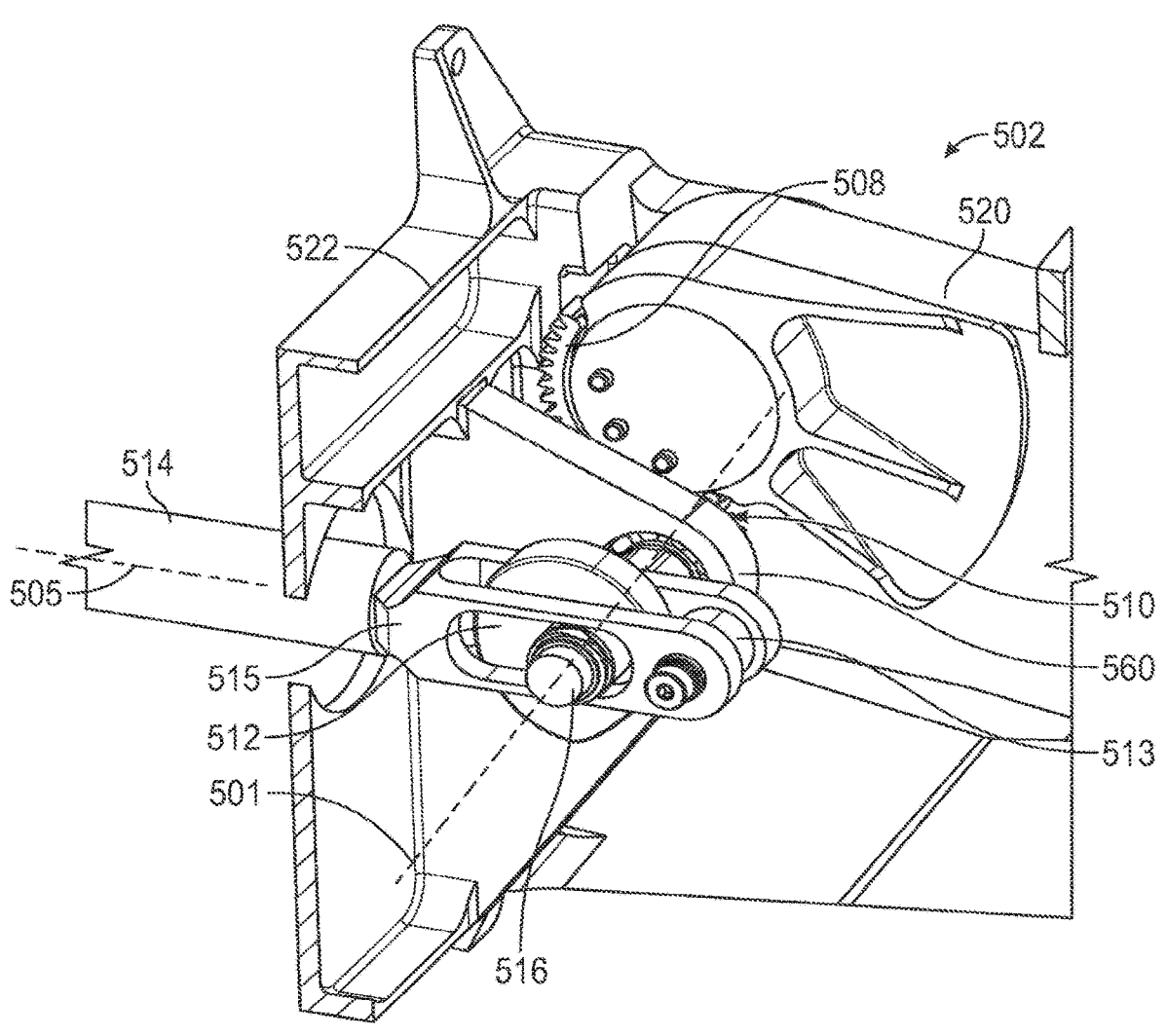
FIG. 8 shows a detail view of an exemplary system with a control rod in tension, according to one or more examples of the disclosure.

Another exemplary cam-control rod configuration is shown in FIG. 8. Unlike system 302, in system 502 the control rod 514 is held in tension. Similar to the systems described above, the system 502 can include a proprotor frame 522 rotatably mounted to a fixed frame 520 that is mounted to a portion of the aircraft (such as to the fuselage, wing, or a boom structure). The system 502 can be configured such that one or more actuators (not shown in figure) drive the proprotor frame 522 to rotate about the rotation axis 501 to tilt a proprotor mounted to the proprotor frame 522 between a vertical thrust position and a forward thrust position.

Similar to the systems described above, the system 502 includes a control rod 514 that engages a cam 512, which rotates based on an engagement with a pinion 510 engaged with a gear 508. The gear 508 can be fixed in position relative to the fixed frame 520. For instance, as shown in FIG. 7, the gear 508 is connected to the fixed frame 520. The cam 512 is fixedly connected to the pinion 510, such as via the shaft 516, so that the cam 512 rotates with the pinion 510. The pinion 510 can be rotatably mounted to the fixed frame 520, such as via a bearing mounting to rib 560, such that the pinion 510 is rotationally coupled to the proprotor frame 522 and moves with the proprotor frame 522. The pinion 510 revolves around the gear 508 as the proprotor frame 522 moves, which rotates the cam 512.

The control rod 514 includes a clevis 515 and a follower 513, which is a roller in this example. As shown, the cam 512 is engaged with the follower 513 such that the follower 513 rolls along the cam 512 as it rotates. The follower 513 is rotatably attached to the clevis 515 of the control rod 514. The control rod 514 is in tension (a force is applied-such as via one or more springs-along axis 514 to the left in the view of FIG. 8) such that the follower 513 is forced against the cam 512. Thus, as the follower 513 rolls along the cam 512, the control rod 514 may translate along axis 505 (depending on the profile of the cam 512). As above, the cam 512 can have any suitable profile that for achieving the desired relationship between blade pitch and proprotor tilt.

Figure 9:
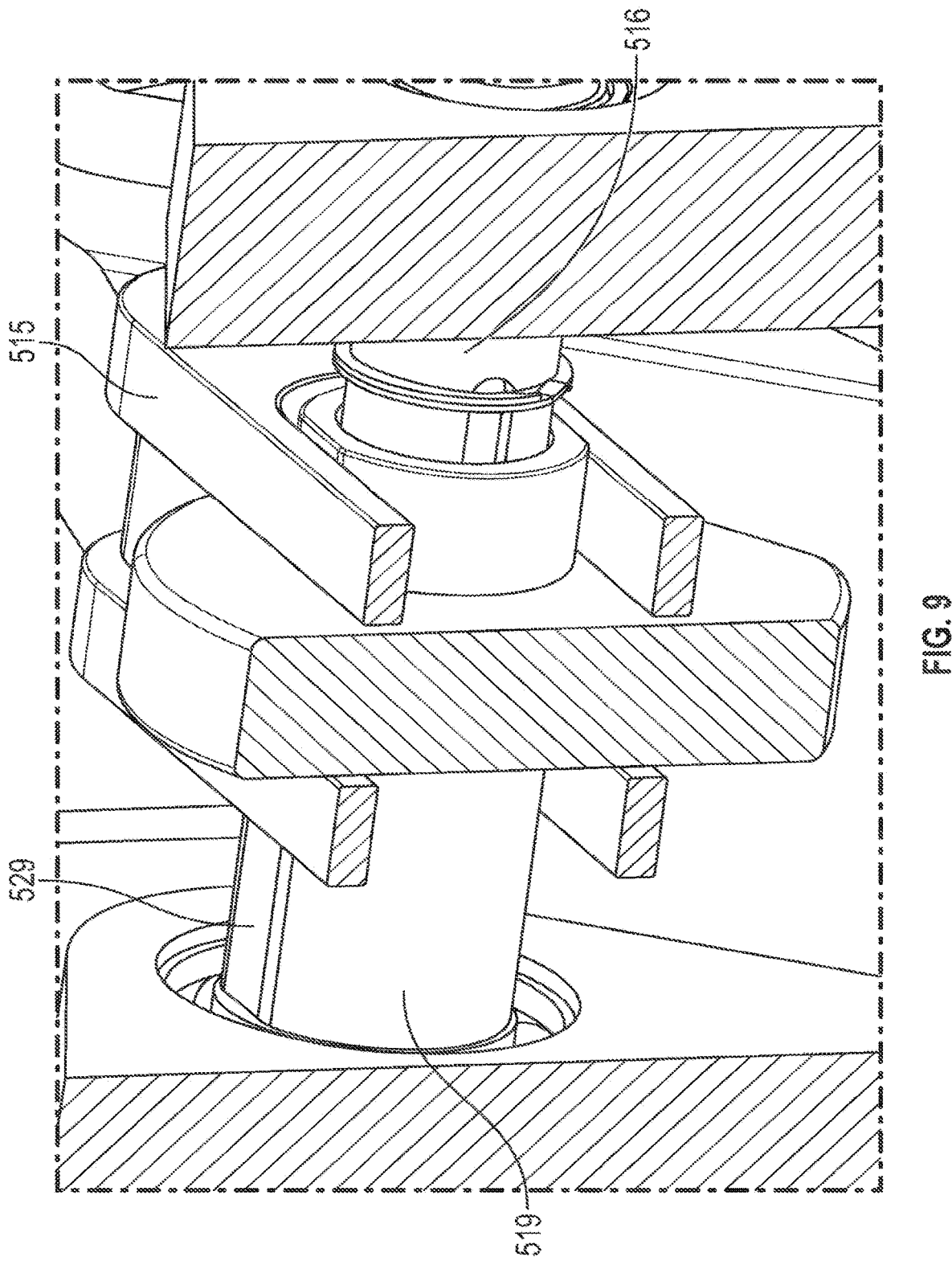
FIG. 9 shows a detail cutaway view of the bushing and cam interface of the exemplary system of FIG. 8, according to one or more examples of the disclosure.

The clevis 515 includes a slot 536 that through which the shaft 516 may extend. The clevis 515 is separated from the shaft 516 by a bushing, which is shown more clearly in FIG. 9, which shows a detail cutaway view of the bushing 519 and clevis 515 interface of the system 502 of FIG. 8. The bushing 519 can include engagement surfaces 529 on the areas of the bushing 519 that engage with the clevis 515, with the engagement surfaces 529 shaped such that the clevis 515 is prevented from rotating, which in turn prevents the control rod attached to the clevis 515 (e.g., the control rod 514 shown in FIG. 8) from rotating. As shown in FIG. 9, the engagement surfaces 529 of the bushings 519 are flat, which corresponds to flat surfaces of the clevis 515. Optionally, these surfaces may be another shape, based on the shape of corresponding surfaces of the clevis 515. For example, the engagement between the clevis 515 and the bushings 519 may involve circular, elliptical, or angled surfaces.

Figure 10:
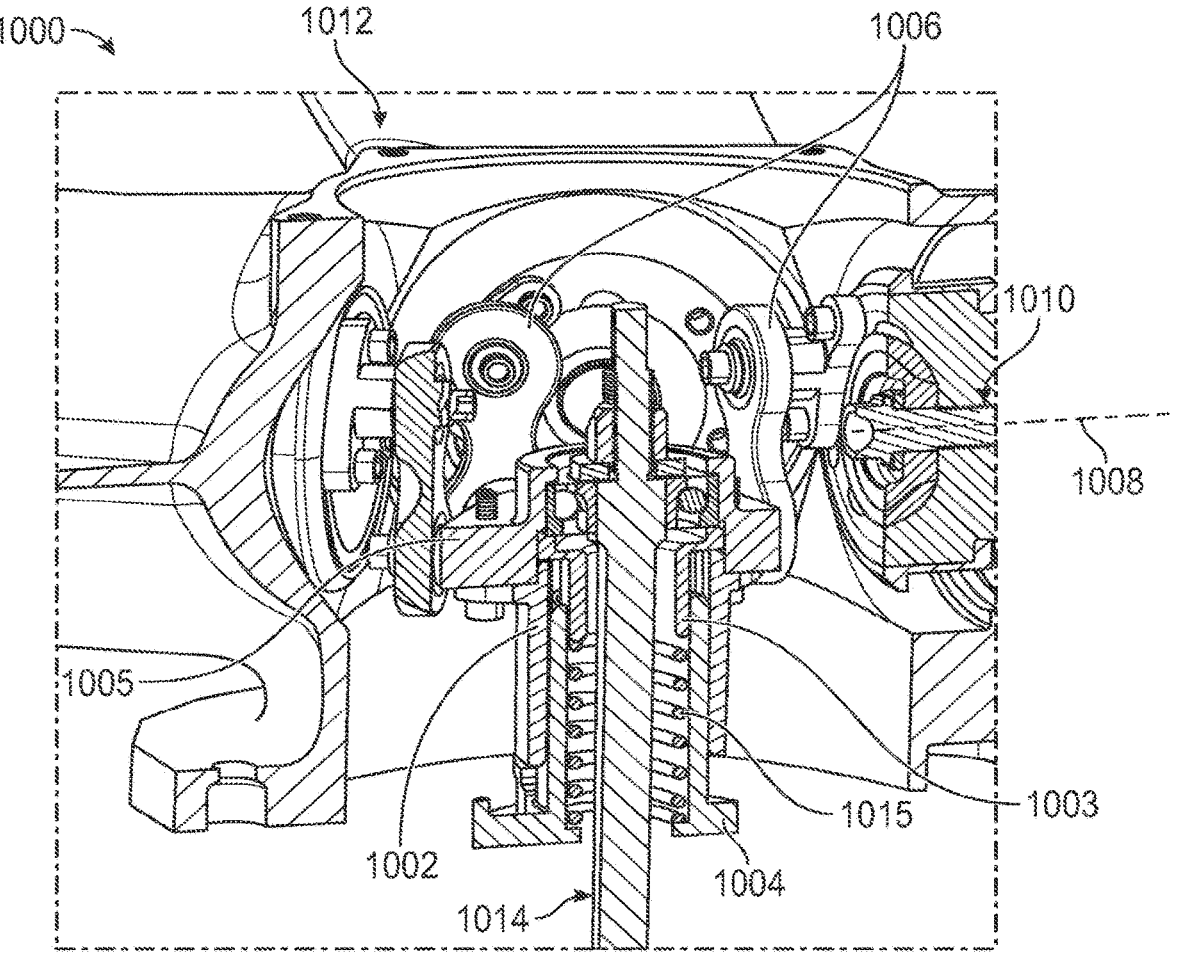
FIG. 10 shows a cutaway detail view of an exemplary hub of a proprotor, according to one or more examples of the disclosure.

As discussed above, translation of the control rod of any of the above exemplary systems can adjust the pitch angle of the blades of the proprotor. The control rod can be operatively engaged with a plurality of blades such that translation of the control rod causes rotation of the blades. FIG. 10 shows a cutaway detail view of an exemplary hub 1000 of a proprotor, showing an example of the coupling of a control rod 1014 with the blades 1012 of the proprotor, according to one or more examples of the disclosure. The hub 1000 can include an engine shaft 1004, a spring 1015, a bearing 1003, a plate 1002, a pitch plate 1005 and a number of links 1006. The blades 1012 are mounted to the hub 1000. For instance, each blade 1012 can include blade roots 1010 that connect to the links 1006. The control rod 1014 connects to the pitch plate 1005 and/or the plate 1002 of the hub 1000. The other end of the control rod 1014 can connect to a system configured to translate the control rod 1014 while tilting a proprotor, as discussed above.

The engine shaft 1004 surrounds the spring 1015 and the bearing 1003 and connects to the plate 1002 that connects to the pitch plate 1005 engaged with the links 1006. The engine shaft 1004 connects to the engine (not shown in figure) of the hub 1000. The plate 1002 is constrained in rotation by a spline interface to the engine shaft 1004 such that the plate 1002 rotates with the engine shaft 1004. The control rod 1014 is prevented from rotating along with the plate 1002 via the bearing 1003. The pitch plate 1005 connects to the blade roots 1010 via links 1006. As shown in FIG. 10, the links 1006 are dog-bone links, however other linkage types are contemplated, such as pitch links, etc. The spring 1015 can maintain the control rod 1014 in tension or compression. In the example of FIG. 10, the spring 1015 maintains the control rod 1014 in tension by pressing the control rod 1014 against the pitch plate 1005.

As the control rod 1014 translates (e.g. advances or retracts axially), the plate 1002 and/or pitch plate 1005 translates, which causes the links 1006 to adjust the pitch angle of the blades 1012 by rotating each blade 1012 about a central axis 1008 of the blade 1012. Rotating each blade 1012 about the central axis 1008 adjusts the pitch angle of the blades 1012. Accordingly, translation of the control rod 1014 can adjust the pitch angle of the blades 1012 of the proprotor.

Figure 11:
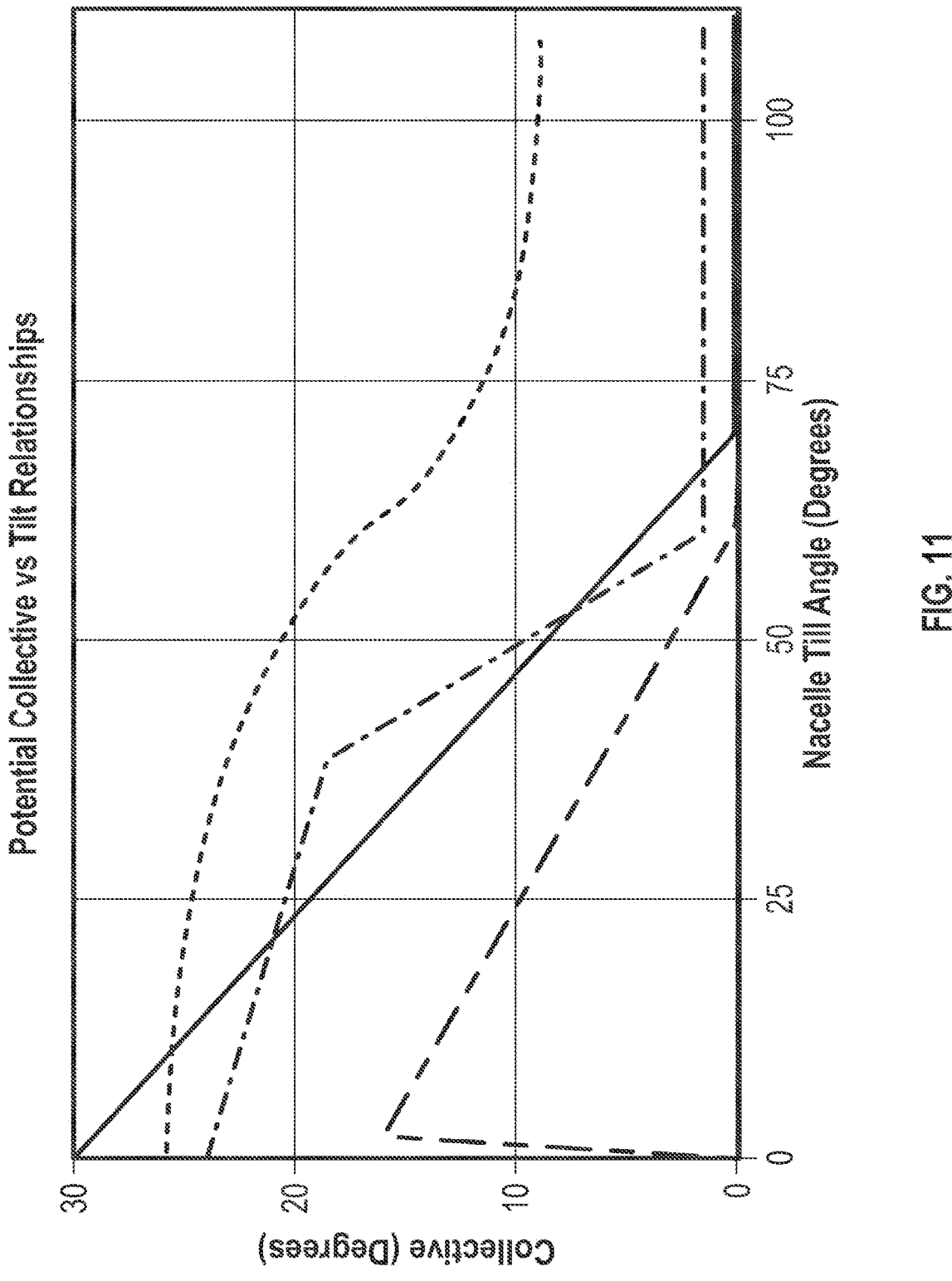
FIG. 11 shows a graph of examples of blade pitch as a function of proprotor tilt angle.

As discussed above, adjusting the pitch of the blades of a proprotor based on the tilt of the proprotor can enable the propeller operational characteristics to be tuned to the different stages of flight, which can lead to greater efficiency that can result in less energy demand over the course of the flight. The relationship between blade pitch and proprotor tilt can be selected by selecting the desired cam profile (e.g., the profile of cam 214). A wide variety of relationships between blade pitch and proprotor tilt are achievable based on the selection of the cam profile. FIG. 11 is a graph that shows examples of some of these relationships.

The graph of FIG. 11 shows blade pitch as a function of proprotor tilt angle. The proprotor tilt angle, which is provided on the X-axis of the graph of FIG. 11, is the angle of the rotational axis of the proprotor relative to a line that extends parallel to a longitudinal axis of the aircraft and intersects the rotational axis of the proprotor. The rotational axis of the proprotor is shown in the example of FIG. 2, as rotational axis 1101-A when the proprotor is in a forward flight position (rotational axis 1101-A is coincident with the line that extends parallel to the longitudinal axis 1102 of the aircraft and intersects the rotational axis of the proprotor) and rotational axis 1101-B when the proprotor is in a lift position. Zero degrees of tilt angle on the graph of FIG. 11 corresponds to the proprotor having a rotational axis that is parallel to the longitudinal axis 1102 of the aircraft—e.g., for providing forward thrust for forward flight, and ninety degrees of tilt angle corresponds to the proprotors providing vertical thrust, such as for vertical take-off and landing.

Figure 12:
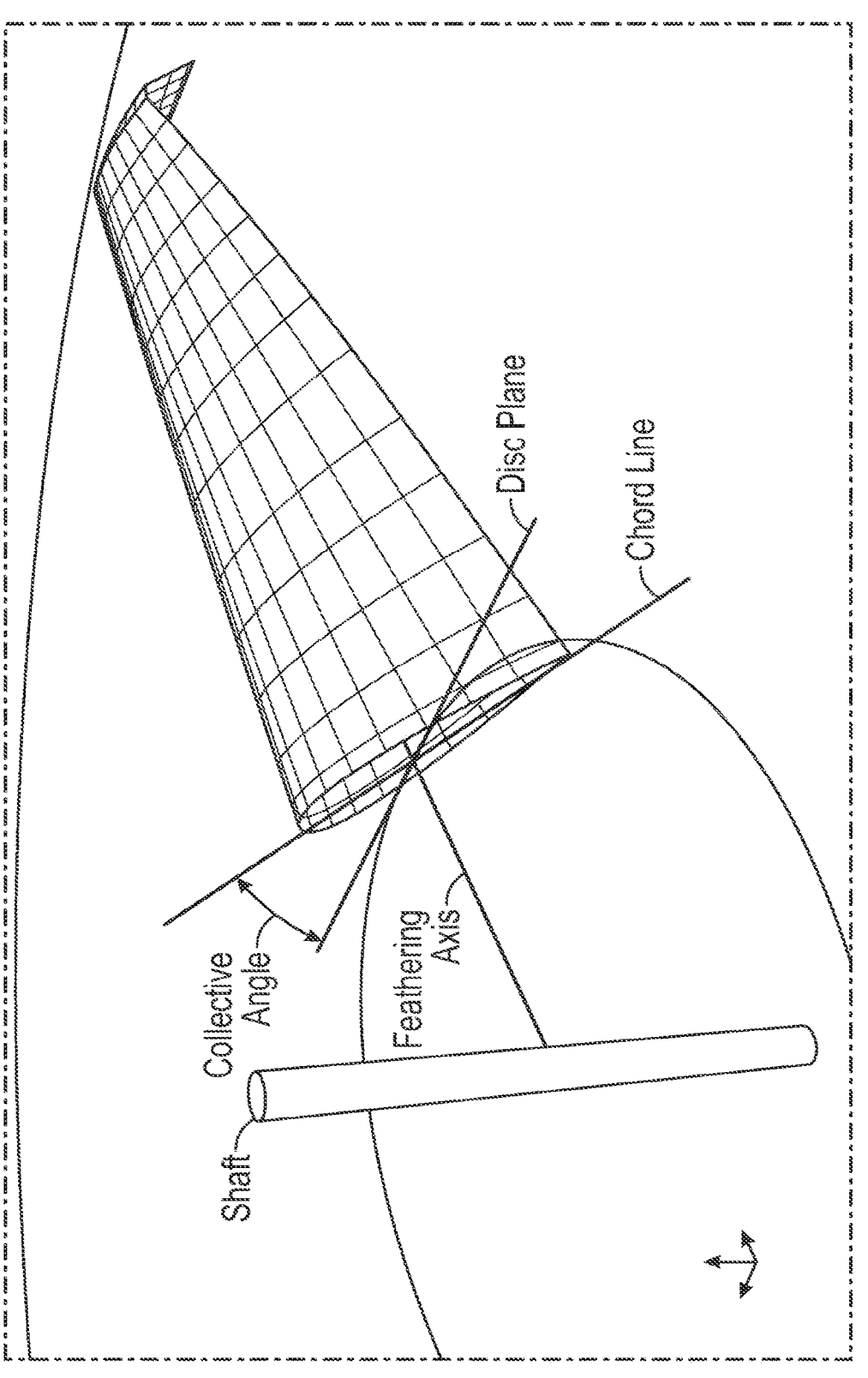
FIG. 12 is a diagram illustrating blade pitch angle.

The pitch of the blades, which is provided on the Y-axis of the graph of FIG. 11, can be defined as the angle between the chord of the blade and the plane of rotation and may be measured at a specific point along the length of the blade. FIG. 12 is a diagram showing an example of the definition of blade pitch. The blade 1208 (only one is shown for simplicity but it will be understood that each proprotor will include multiple blades) revolves about proprotor rotational shaft 1214 and is mounted such that it can rotate about a pitch axis 1206, enabling the pitch 1216 of the blade 1208 to be adjusted. The plane that contains the pitch axis 1206 and is traversed by the blade 1208 when the blade 1208 rotates can be referred to as the disc plane 1210. The pitch 1216 of the blade 1208 can be defined as the angle between the chord 1204 of the blade 1208 (a line joining the leading edge and trailing edge of the blade 1208) and a line 1202 lying within disc plane 1202 that is perpendicular to the pitch axis 1206. The pitch values shown in FIG. 11 are merely exemplary and it will be understood by a person of ordinary skill in the art that the pitch values will depend on the specific design of the blades and the location along the blades where the pitch is measured. Similarly, the proprotor tilt values shown in FIG. 11 are merely exemplary and it will be understood by a person of ordinary skill in the art that a different range of proprotor tilt could be used, including a negative tilt angle associated with the proprotor being tilted somewhat downwardly.

FIG. 11 includes four different lines 1102-1108 indicating four different relationships between blade pitch and proprotor tilt. Each line is associated with a different cam profile. Lines 1102, 1104, and 1106 have maximum blade pitches (maximums for the given line) at a zero proprotor tilt angle. This can be the blade pitch for forward flight in which the higher blade pitch can provide better efficiency at the relatively high airspeeds of forward flight.

Line 1108 has a very low blade pitch at zero proprotor tilt. This could result in the blades creating a relatively high drag at high airspeeds, which can be useful to slow down the aircraft, such as for landing. This low blade pitch may also be useful for increasing the efficiency of the proprotor at low airspeeds, such as during a conventional (airplane style) take-off. The blade pitch quickly increases to a maximum so that the proprotor need only be tilted a relatively small amount to achieve the maximum blade pitch, which may be a desirable blade pitch for forward flight. With this relationship, the proprotor need only be tilted a small amount relative to the minimum tilt (e.g., zero tilt as shown, a small positive tilt, a small negative tilt, etc.) to achieve a more optimal blade pitch for the high speeds of forward flight.

Each line 1102-1108 shows the blade pitch decreasing to a minimum blade pitch (minimum for the given relationship) that is associated with a maximum proprotor tilt-tilt that may be used for vertical flight and hover. The minimum blade pitch can be optimal for the low air speed and high thrust requirements of vertical flight and hover. Lines 1104 and 1106 demonstrate that the minimum blade pitch need not be zero. The particular proprotor tilt angle at which the blade pitch minimum is reached can be selected based on the cam profile, as demonstrated by the different locations of this point for the various relationships (e.g., point 1110).

Each relationship 1102-1108 is achieved by a different cam profile. Cam profiles can include multiple regions having different shaped to achieve the changes in relationship between the blade pitch and proprotor tilt of the various lines 1102-1108. For example, line 1102 can be achieved by a cam profile that includes a spiral section that corresponds to the range of zero degrees proprotor tilt to the proprotor tilt angle of point 1110. The spiral section (continuously changing radius) transitions to a circular section (constant radius) that provides for the unchanging blade pitch associated with proprotor tilt angles past point 1110. Line 1106 can be achieved by a first spiral section, followed by a second spiral section that has a different rate of change of the radius than the first spiral section, followed by a circular section. Line 1104 can be achieved by a cam profile that has continuously varying rates of change of radius.

The relationships shown in FIG. 11 are merely examples illustrating that many different relationships can be achieved by the appropriate selection of the cam profile. A person of ordinary skill in the art will understand that the desired relationship between blade pitch and proprotor tilt can be achieved by the appropriate cam profile design.

Secondary Load Path with Passive Damper for Tiltable Components

As described above, actuator disconnection from tiltable aircraft components poses a risk for catastrophic failure resulting from uncontrolled movement of the tiltable components. A passive damper as described herein provides a mechanism for dampening high velocity tilting of the tiltable proprotor in the event of actuator disconnection. The possibility of catastrophic failure resulting from actuator disconnection could potentially be mitigated by introducing a redundant actuator such that if a first actuator fails (e.g., by a break in the actuator shaft), another actuator takes over, and/or overdesigning aircraft structural components so that a particular failure mode is not catastrophic, but these mitigation methods can be costly and introduce undesired additional weight into the aircraft design. The passive dampers described herein provides for a less massive and cost-efficient catastrophic failure prevention method.

Passive dampers are configured to apply a force (a hydraulic or pneumatic force) to the connected components only when the connected components are in motion (i.e., no bias is applied when a connected component is at rest). The passive dampers described herein can be connected between a boom of the aircraft and a tiltable proprotor to apply a damping force when a tilt angle of the tiltable proprotor is being adjusted. As described above, the passive dampers may include a balanced hydraulic or pneumatic cylinder (a "balanced uncharged damper"). Balanced uncharged damper cylinders may include a piston that slides within the cylinder, wherein the piston includes a plurality of apertures through which damping fluid flows while the piston moves through the cylinder. The piston can be attached to a piston rod that extends from the cylinder and can be rotatably attached to a tiltable proprotor of the aircraft. As the tiltable proprotor rotates either toward a lift or forward flight position, it will exert a tensile or compressive force, depending on the direction of tilt, on the piston rod, either urging the piston rod away from the piston cylinder or toward the piston cylinder. In turn the piston will be forced to slide within the cylinder as the proprotor tilts in either direction. The damper dissipates energy (e.g., by converting kinetic energy to heat) as the piston moves through the damping fluid due to the resistance of the damping oil as applied to the piston, thus dampening the tilting velocity of the tiltable proprotor.

In some examples, the passive dampers may include unbalanced cylinders (an "unbalanced damper") in place of a balanced hydraulic or pneumatic cylinder. The unbalanced dampers similarly include a piston that slides within the cylinder and includes a plurality of apertures through which damping fluid flows while the piston moves through the cylinder but can also include pressurized gas within the cylinder in addition to the damping fluid. When a force exerted on the damper piston, the pressurized gas can compress or expand, depending on the direction of the force. As such, the pressurized gas can absorb an initial sudden force exerted on the damper piston. Thus, if the actuator shaft breaks, the damper dampens high velocity tilting of the tiltable proprotor, thus preventing catastrophic failure. Additionally, a passive damper requires no activation, engagement, or other control to perform its function of dampening the high velocity tilting of the tiltable proprotor. As such, it provides a reliable and simple solution to the actuator disconnect failure mode described herein.

Figure 13:
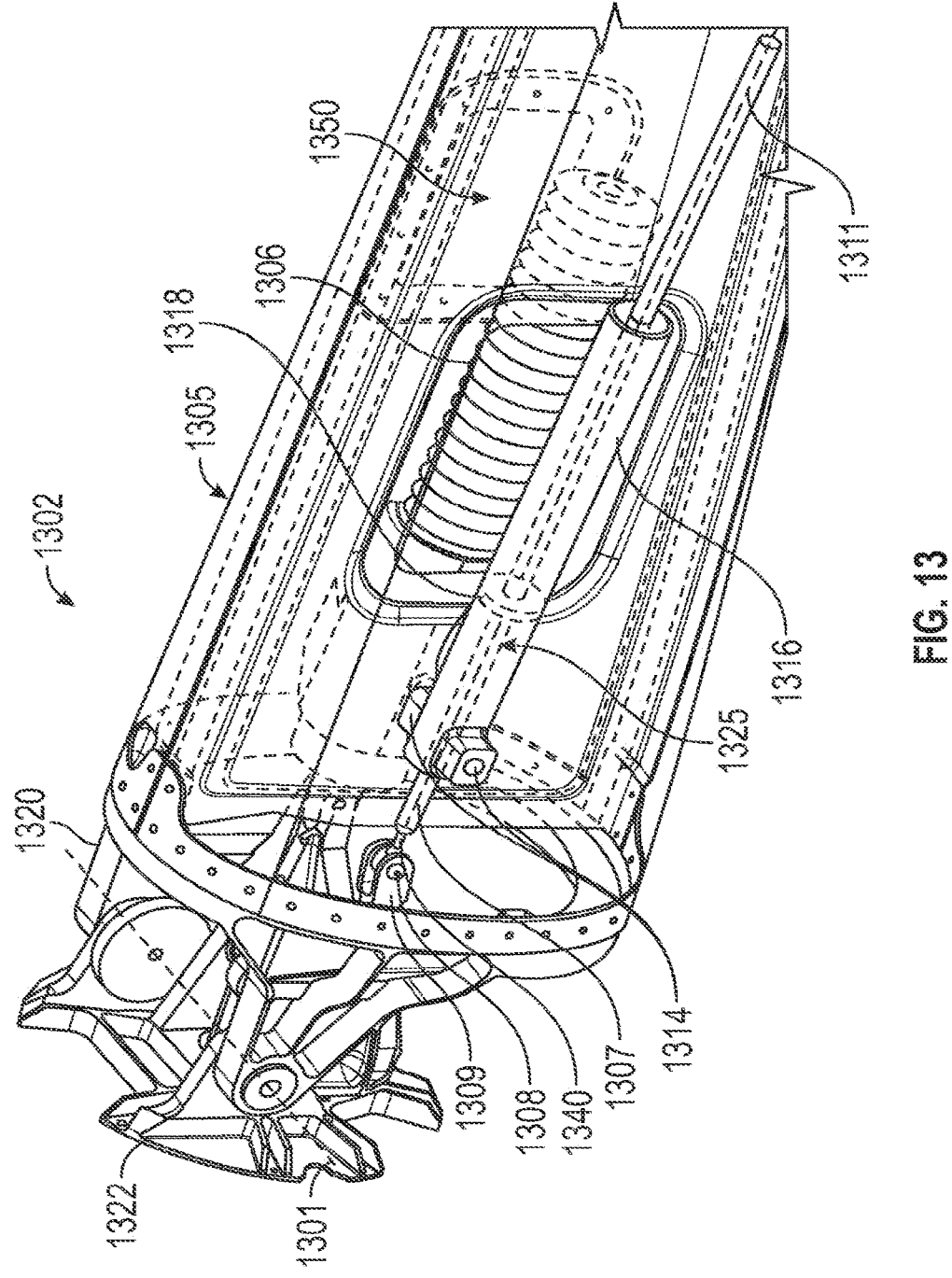
FIG. 13 shows a detail view of an exemplary system, according to one or more examples of the disclosure.

In one or more examples, any of the systems described above, such as system 202, system 302, system 402, system 502, and aircraft 100 can include a damper, as shown in the exemplary system 1302 of FIG. 13, for limiting a rate of tilt of the proprotor, such as in the event of actuator failure. The system 1302 can be implemented in an aircraft with a tiltable proprotor instead of, or in addition to, redundant actuators and/or a joint assembly including a fail-safe latch as described below.

The damper 1325 can include a balanced hydraulic or pneumatic cylinder 1316, respectively, which as is known in the art includes a piston 1318 that slides within a cylinder and is connected to a piston rod 1307 or 1407, wherein the piston includes a plurality of apertures (not shown) through which fluid flows as the piston moves within the cylinder. The damper 1325 of system 1302 is connected between the boom 1305 of an aircraft, such as aircraft 100 of FIGS. 1 and 2, and the proprotor frame 1322, to which a proprotor (not shown) mounts. The damper 1325 can be housed within an outer shell of the boom 1305. In one or more examples, the boom 1305 can include a rib 1350, and the actuator 1306 and the damper 1325 can be positioned on opposite sides of the rib 1350. The proprotor frame 1322 is titltably connected to the fixed frame 1320 such that the proprotor frame 1322 (and the proprotor) can tilt about rotation axis 1301. The actuator 1306 is connected to the proprotor frame 1322 and drives the tilting of the proprotor about the rotation axis 1301.

The damper 1325 can be rotatably attached to the boom 1305 by one or more mounts 1314 on a first side to the rib 1350 and on a second side to the outer shell of boom 1305. The damper 1325 is rotatably connected to the proprotor frame 1322 at a connector 1340 of the piston rod 1307 of damper 1325. The connector 1340 of the piston rod 1307 of damper 1325 can be rotatably connected to a pin 1308 extending between two sides of a clevis bracket 1309. Thus, as the actuator 1306 tilts the proprotor frame 1322 toward the lift position (clockwise with respect to the view of FIG. 13), the proprotor frame 1322 exerts a tensile force on the piston rod 1307 of damper 1325, urging the piston rod 1307 to extend out of the cylinder. The fluid within the cylinder resists such movement, resulting in a counteracting force acting against the piston 1318 within damper 1325 that is proportional to the velocity of movement of the piston. The plurality of apertures in the piston allows the damping fluid to flow through the piston 1314 such that the piston can move within the cylinder and in turn allowing the piston rod 1307 extend from the cylinder until the proprotor has reached the lift position. Likewise, as the actuator 1306 tilts the proprotor frame 1322 toward the forward flight position (counterclockwise with respect to the view of FIG. 13), the proprotor frame 1322 exerts a compressive force on the piston rod 1307 of damper 1325, urging the piston rod 1307 to retract into the cylinder 1316. The fluid within the cylinder similarly resists such movement, resulting in a counteracting force acting against the piston 1318 within damper 1325 that is proportional to the velocity of movement of the piston.

In one or more examples, the actuator 1305 can be a linear actuator. Alternatively, the actuator can be a rotary actuator, as shown in the exemplary system 1402 of FIG. 14. The system 1402 is otherwise similar to system 1302 of FIG. 13 in that it includes a damper 1425 connected between a boom 1405 of an aircraft and a proprotor frame 1422, which is tiltably connected to the fixed frame 1420 such that the proprotor frame 1422 (and the proprotor) can tilt about the rotation axis 1401. System 1402 includes a rotary actuator 1406 connected to the proprotor frame 1422 that drives the tilting of the proprotor about the rotation axis 1401. In the illustrated embodiment, the rotary actuator 1406 includes an electric motor connected to a gear train that drives a worm gear. The worm gear drives a gear to rotate about the rotation axis 1401, which tilts the proprotor.

If the actuator 1306 (or actuator 1406 of FIG. 14) were to become disconnected from the proprotor frame 1322 or 1422, respectively, catastrophic failure may occur, as the proprotor could begin rapidly tilting without control. In one or more examples, the system 1302 or 1402 could include a second (redundant) actuator that is also connected to the proprotor frame 1322 or 1422 such that if the first actuator 1306 or 1406 becomes disconnected, the second actuator can nonetheless control the tilting of the proprotor about the rotation axis 1301 or 1401. However, adding a second actuator may complicate the system 1302 or 1402, increase cost, and add more weight to the aircraft. Rather than implementing a second actuator, the systems 1302 and 1402 instead include a damper mechanism such as damper 1325 or 1425, respectively. In the event that the actuator 1306 or 1406 becomes disconnected from the proprotor frame 1322 or 1422, the damper 1325 or 1425 dissipates energy and, thereby, dampens a tilting velocity of the proprotor, which eliminates the catastrophic result of the actuator 1306 or 1406 disconnecting from the proprotor frame 1322 or 1422.

As noted above, the damper 1325 or 1425 can be rotatably connected to a pin 1308 or 1408 extending between two sides of a clevis bracket 1309 or 1409, the clevis bracket fixedly attached to the proprotor frame, 1322 or 1422, respectively. If the actuator 1306 (or actuator 1406 of FIG. 14) were to become disconnected from the proprotor frame 1322 or 1422, respectively, the damper 1325 or 1425 would dampen the tilting velocity of the proprotor as the proprotor is moving but would apply no damping force when the proprotor is at rest. As the proprotor tilts toward the forward flight position, the proprotor frame 1322 or 1422 exerts a compressive force on the damper piston rod 1307 or 1407 via the clevis bracket 1309 or 1409 urging the damper piston rod 1307 or 1407 to retract into the cylinder 1316 or 1416. Similarly, the proprotor frame 1322 or 1422 exerts a tensile force on the damper piston rod 1307 or 1407 via the clevis bracket 1309 or 1409 as the proprotor frame 1322 or 1422 (and proprotor) tilts toward the lift position, urging the piston rod 1307 or 1407 to extend outwardly from the piston cylinder 1316 or 1416. As the proprotor frame 1322 or 1422 (and proprotor) tilt in either direction following actuator disconnect, the fluid within the cylinder acts to resist the extension or retraction of the damper piston rod 1307 or 1407 by exerting a counteracting force acting against the piston 1318 or 1418 within damper 1325 that is proportional to the velocity of movement of the piston. The plurality of apertures in the piston allows the damping fluid to flow through the piston such that the piston can move within the cylinder and in turn allowing damper piston rod 1307 or 1407 to extend or retract at a dampened velocity. Thus, the damper 1325 or 1425 dissipates rotational energy of the proprotor by exerting a force in the opposite direction of the direction of tilt of the proprotor.

As noted above with regard to the systems 1302 and 1402, the damper 1325 and/or 1425 can include a balanced hydraulic or pneumatic cylinder 1316 or 1416, respectively, which as is known in the art includes a piston 1318 or 1418 that slides within a cylinder and is connected to a piston rod 1307 or 1407, wherein the piston includes a plurality of apertures (not shown) through which fluid flows as the piston moves within the cylinder. Balanced dampers contain less damping fluid than unbalanced dampers, and are therefore generally less massive than unbalanced dampers. The balanced dampers disclosed herein may require between 0.25 and 0.5 quarts of damping fluid. In some examples, the balanced dampers require less than 0.35 quarts of damping fluid. In comparison, traditional dampers can require between 0.51 and 1.0 quarts of damping fluid. In some examples, the conventional dampers disclosed herein can require at least 0.74 quarts of damping fluid. In some examples, the dampers 1325 or 1425 may include a fire resistant damping fluid, for instance MIL-PRF-83282 or MIL-PRF-87257. MIL-PRF-83282 is a fire-resistant damping fluid; however, the fluid becomes more viscous at low temperatures which induces more parasitic drag during cold operation. MIL-PRF-87257 maintains similar fire resistance to MIL-PRF-83282 but with improved low temperature viscosity performance.

As noted above, the dampers 1325 and 1425 are passive dampers configured to apply a force (a hydraulic or pneumatic force) to the proprotor frame 1322 or 1422 (and proprotor), respectively, only when the tilt angle of the proprotor is being adjusted (i.e., no bias is applied when the proprotor is at rest). In one or more examples, the systems 1302 and 1402 may include one or more redundant actuators as well as a damper mechanism such as damper 1325 or 1425, respectively.

The damper 1325 or 1425 can be configured to limit the rate of change of the tilt angle of the proprotor frame 1322 or 1422, respectively, in both tilt directions. The damper 1325 or 1425 can be positioned such that a force vector of the damper 1325 or 1425 can extend beneath the tilt axis, such as tilt axis 118 of FIG. 2. In one or more examples, the damper 1325 or 1425 can be configured to limit the rate of change of the tilt angle of the proprotor in the event that the actuator 1306 or 1406 becomes disconnected from the proprotor frame 1322 or 1422, respectively. According to some examples, the dampers described herein may limit a rate of change of tilt of the proprotor to a maximum of 100 degrees per second at maximum operating load. In some examples, the damper may limit the rate of change of the tilt angle of the proprotor to between 100 and 300 degrees per second. In some examples, the damper may limit the rate of change of the tilt angle of the proprotor to between 100 and 200 degrees per second. In some examples, the damper may limit the rate of change of the tilt angle of the proprotor to between 150 and 180 degrees per second. In some examples, damper may limit the rate of change of the tilt angle of the proprotor to less than 200 degrees per second, less than 150 degrees per second, less than 100 degrees per second, less than 50 degrees per second, or less than 20 degrees per second.

As discussed above, in some examples the damper 1325 or 1425 may be a balanced uncharged damper. In such examples, the damper 1325 or 1425 may be configured to handle a peak damping pressure of between 2000 psi and 4000 psi. In some examples, damper 1325 or 1425 may be configured to handle a peak damping pressure of approximately 3000 psi. The damper 1325 or 1425 may be configured with an outer cylinder diameter of between one and two inches, a piston diameter of between 0.25 and 0.75 inches, a stroke between 9 and 11 inches, a body length of between 10 and 12 inches, and an orifice diameter between 0.04 and 0.07 inches. The mass of the damper 1325 or 1425 may be between two and four pounds. For instance, an exemplary balanced uncharged damper weighs approximately 2.2 pounds, and this weight may include the damper cylinder, damper rod/piston and damper fluid, as well as an uncertainty factor for bearings, rod ends, trunnions, and other miscellaneous attachments. The peak power consumed by the damper during transition (i.e., while the proprotor is transitioning between the forward flight configuration and the lift/hover configuration during normal operation) may be 0.7 watts and the peak power consumed by the damper during hover (i.e., when stabilizing adjustments are made to the proprotor tilt angle while the proprotor is in a lift/hover configuration during normal operation) may be 6.3 watts.

In other examples, the damper 1325 or 1425 may be an unbalanced damper. In such examples, the damper 1325 or 1425 may be configured to handle a maximum damping pressure of between 2000 psi and 4000 psi, and in some examples may be configured to handle a maximum damping pressure of 3000 psi. The unbalanced damper may be configured to operate at a working pressure (or a pre-charge) of between 1000 psi and 2000 psi, and in some examples, the working pressure/pre-charge may be configured at approximately 1500 psi. The load from differential area of the unbalanced damper 1325 may be between 300 lbf and 400 lbf, and in some examples, the load from differential area of the unbalanced damper 1325 or 1425 may be approximately 330 lbf. The damper 1325 or 1425 may be configured with an outer cylinder diameter of between 1.5 and 2.5 inches, an inner rod diameter of between 0.25 and 0.75 inches, a stroke between 9 and 11 inches, a body length of between 13 and 14 inches, and an orifice diameter between 0.08 and 0.10 inches. The mass of the damper 1325 or 1425 may be between two and four pounds. For instance, an exemplary unbalanced damper weighs approximately 2.9 pounds, and this weight may include the damper cylinder, damper rod/piston and damper fluid, as well as an uncertainty factor for bearings, rod ends, trunnions, and other miscellaneous attachments. The maximum power consumed by the damper

1325 or 1425 during transition may be between 25 and 30 watts and the peak power consumed by the damper 1325 during hover may be between 60 and 65 watts.

According to the exemplary design specifications of the respective balanced uncharged dampers and unbalanced dampers above, a balanced uncharged damper may provide an advantageous configuration with respect to power consumption and may be less massive than a unbalanced damper, primarily due to its lack of pre-charge. Various additional or ndifferent design modifications could be made to the exemplary dampers described herein (e.g., dampers 1325 and 1425 above, as well as dampers 1525 and 1625 described below) without deviating from the scope of the claims. For instance, the passive dampers may be configured for stroke sensitive damping, which may be accomplished with one or more axial grooves in the damper cylinder to reduce damping in a portion of the stroke or with a stepped bore/piston with a secondary flow path with additional restriction. The passive dampers can also be configured with staged valving, an increased rate shim stack, and/or a pressure relief in the staged valving to allow for a wider range of rates near the design operating load. Additionally, the passive dampers may include a solenoid directional control valve with pressure reliefs. The passive dampers may also include various design features to mitigate latent failures of the dampers. For instance, the dampers may include a sight glass to inspect for oil or a pressure transducer configured to monitor and verify nominal damping at a normal operating rate towards an end stop of the aircraft.

In one or more examples, controlling an aircraft that includes one or more dampers, as discussed above can include receiving a command at a controller to adjust a tilt angle of a tiltable proprotor that is tiltable between a lift position for providing lift for the aircraft and a forward flight position for providing forward propulsion for the aircraft, and controlling at least one actuator to adjusting the tilt angle of the tiltable proprotor according to the command, wherein at least one passive damper is connected to the tiltable proprotor to limit a rate of change of the tilt angle of the tiltable proprotor.

Figure 14:
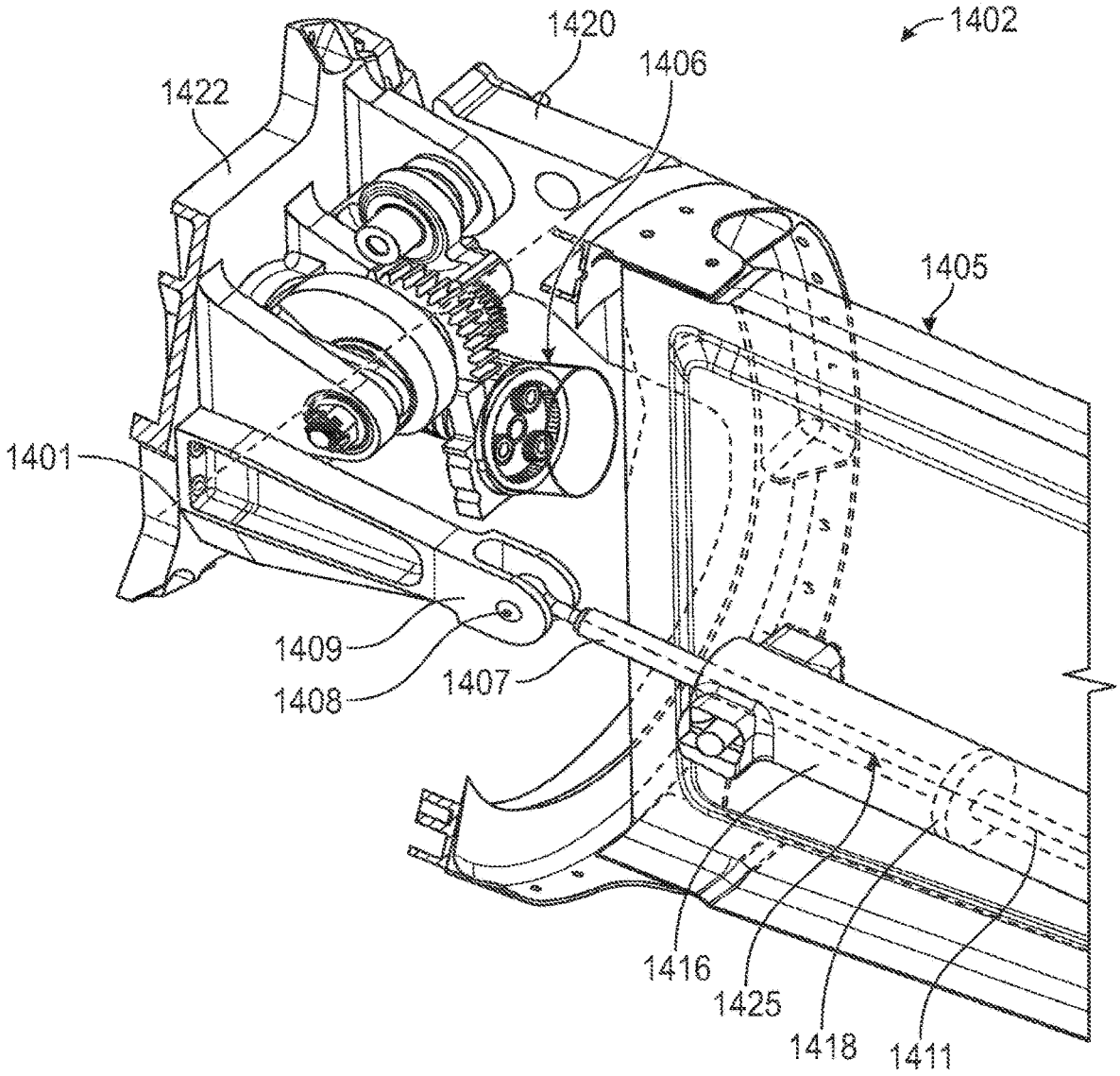
FIG. 14 shows a detail view of an exemplary system, according to one or more examples of the disclosure.
Figure 15A:
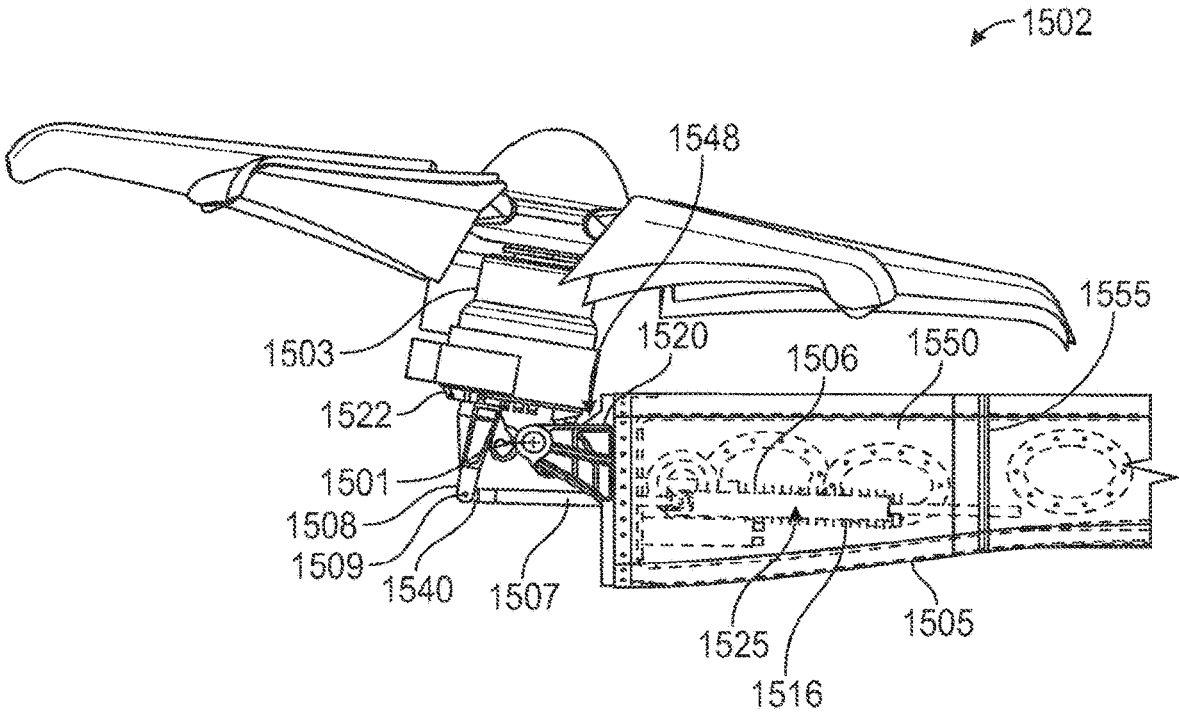
FIG. 15A shows a detail view of an exemplary tiltable proprotor damping system in a first configuration, according to one or more examples of the disclosure.
Figure 15B:
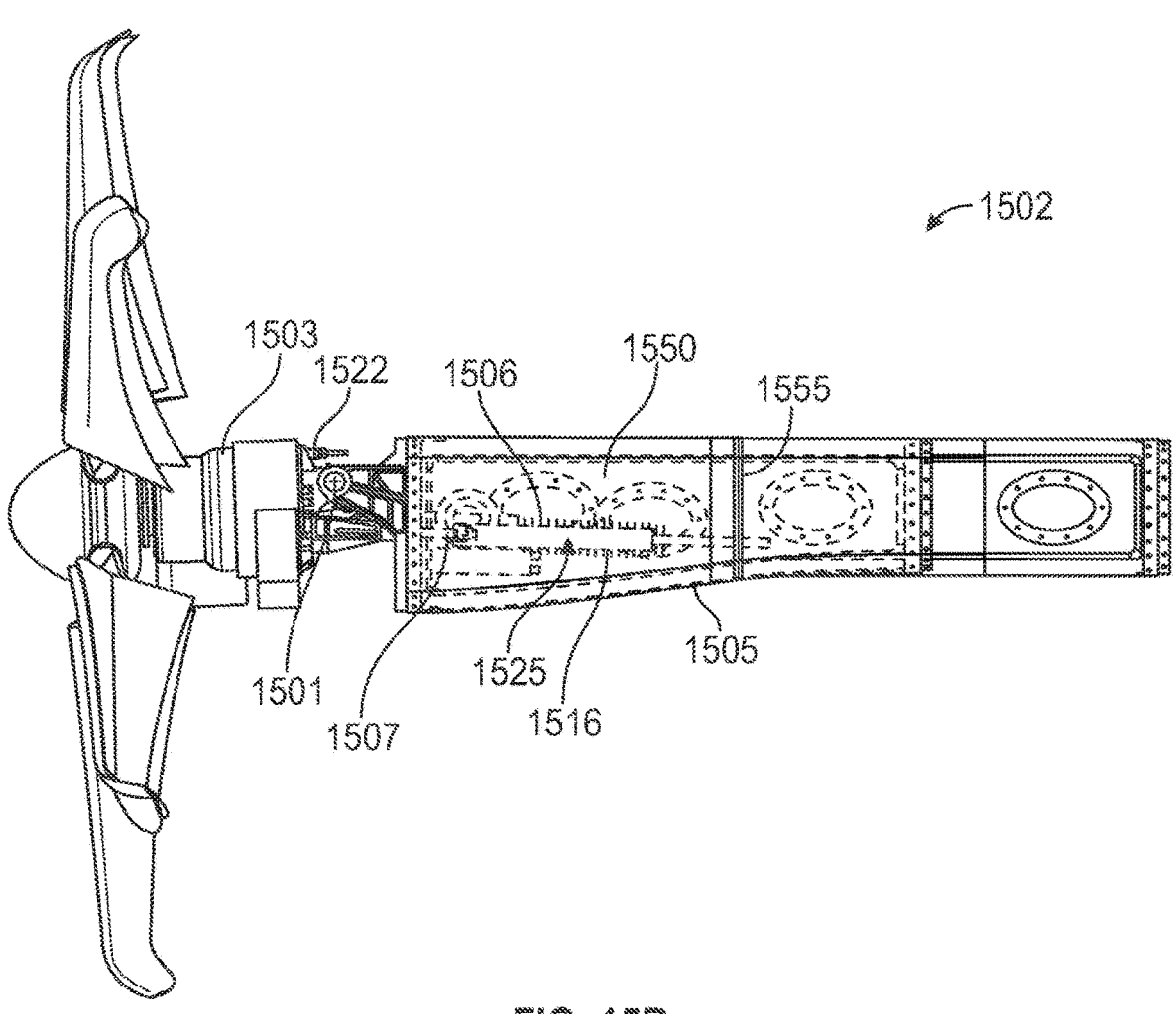
FIG. 15B shows a detail view of an exemplary tiltable proprotor damping system in a second configuration, according to one or more examples of the disclosure.

FIGS. 15A and 15B illustrate a system 1502, similar to the system 1302 and 1402 illustrated above in FIGS. 13 and 14, mounted between a boom of the aircraft and a tiltable proprotor. The tiltable proprotor (omitted from FIGS. 13 and 14) is shown in the lift position in FIG. 15A and in the forward flight position in FIG. 15B. As such, FIGS. 15A and 15B depict how a damper 1525 moves in response to changes in the tilt angle of the tiltable proprotor.

FIG. 15A depicts a first configuration of system 1502 including damper 1525. The system 1502 includes the proprotor 1503, which was omitted from FIG. 13, in a lift configuration and rotatably connected to both the linear damper 1525 and a linear actuator 1506. The damper 1525 and actuator 1506 of system 1502 are connected between a boom 1505 of an aircraft, such as aircraft 100 of FIGS. 1 and 2, and the proprotor frame 1522, to which the proprotor 1503 mounts. In one or more examples, the boom 1505 can include a rib 1550, and the actuator 1506 and the damper 1525 can be positioned on opposite sides of the rib 1550. The boom 1505 may also include one or more bulkheads 1555, through which a portion of the piston rod 1507 of damper 1525 extends. The proprotor frame 1522 is tiltably connected to the fixed frame 1520 such that the proprotor frame 1522 (and the proprotor 1503) can tilt about rotation axis 1501. The actuator 1506 can be connected to the proprotor frame 1522 and drive the tilting of the proprotor about the rotation axis 1501. In one or more examples, the actuator 1505 can be a linear actuator.

The actuator 1506 can be configured to tilt the proprotor 1503 between the lift configuration depicted in FIG. 15A and the forward flight configuration depicted in FIG. 15B. When the actuator tilts the proprotor 1503 between the lift configuration depicted in FIG. 15A and the forward flight configuration depicted in FIG. 15B, the damper 1525 can exert a force in the opposing direction to the movement of the proprotor. As the actuator tilts the proprotor 1503, the fluid within the cylinder 1516 of damper 1525 acts to resist the extension or retraction of the damper piston rod 1507 by exerting a counteracting force acting against the piston (not shown) within the cylinder 1516 of damper 1525 that is proportional to the velocity of the movement of the piston. A plurality of apertures (not shown) in the piston allow the damping fluid to flow through the piston such that the piston can move within the cylinder. In turn, piston rod 1507 of damper 1525 can extend or retract thus permitting the proprotor to tilt under the influence of the actuator in normal operation. The damper 1525, like the dampers 1325 of FIG. 13 and 1425 of FIG. 14, is a passive damper configured to apply a force (a hydraulic or pneumatic force) to the proprotor frame 1522 (and proprotor) only when the tilt angle of the proprotor is changing (i.e., no bias is applied when the proprotor is at rest).

As described above, without the damper 1525, if the actuator 1506 were to become disconnected from the proprotor frame 1522 (e.g., by a break in the actuator shaft), the proprotor 1503 could rapidly tilt in an uncontrolled manner, ultimately leading to catastrophic failure of the aircraft. The damper 1525 is configured to control the rate of change of the tilt angle of the proprotor 1503 such that if the actuator 1506 becomes disconnected from the proprotor frame, the proprotor 1503 is prevented from tilting at a velocity that could damage the aircraft. The damper 1525 is configured to apply a compressive or tensile forces against the proprotor frame 1522, depending on the direction of tilt, in substantially the same manner as when the actuator is connected to the proprotor, thus damping the tilting velocity of the proprotor if the actuator becomes disconnected.

Figure 16:
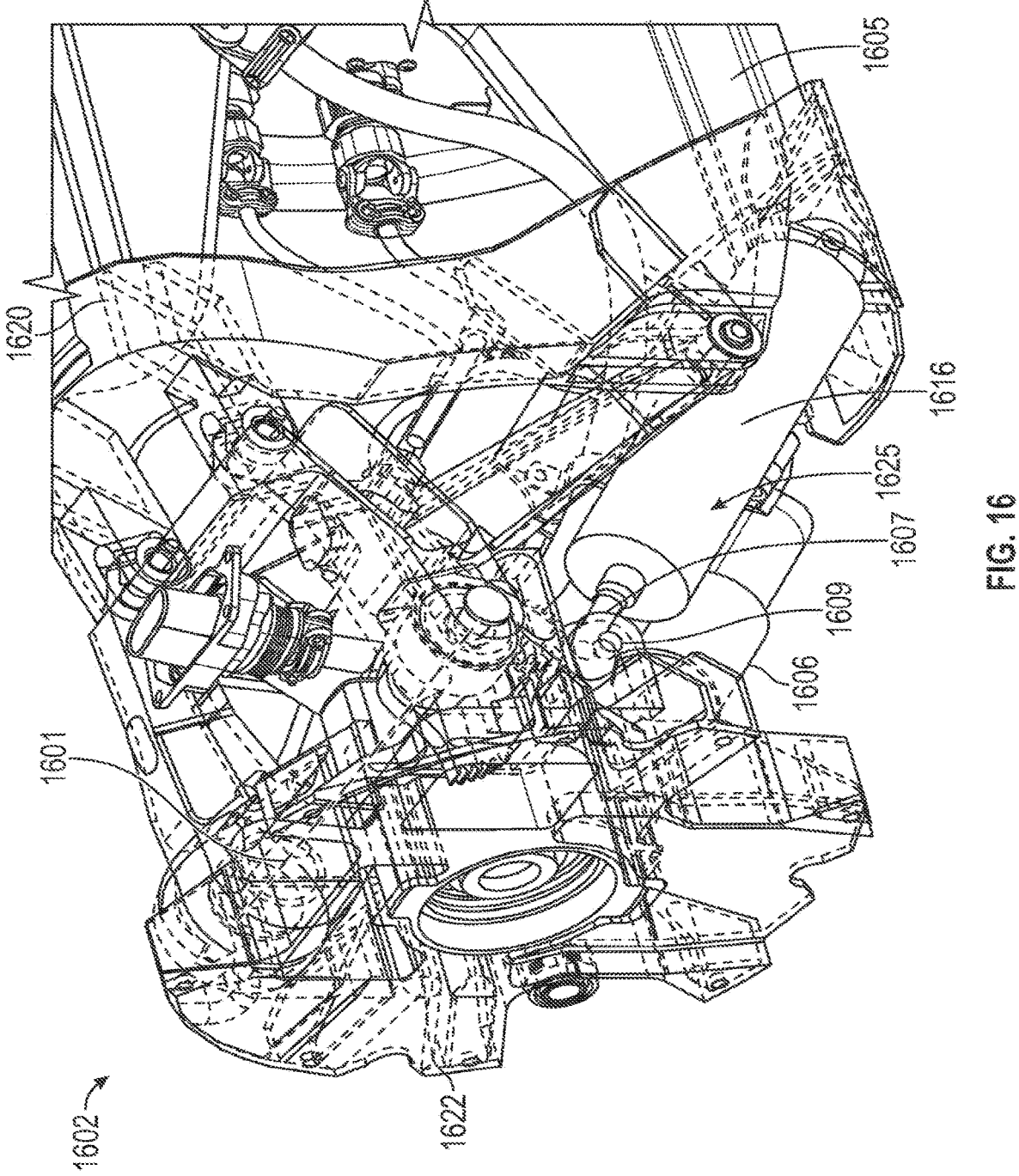
FIG. 16 shows a detail view of an exemplary tiltable proprotor damping system, according to one or more examples of the disclosure.

FIG. 16 illustrates a system 1602 which includes a damper in an alternative configuration to that shown above with in FIGS. 13, 14, and 15A-15B. In one or more examples, any of the systems described above, such as system 202, system 302, system 402, system 502, and aircraft 100 can include a damper, as shown in the exemplary system 1602 of FIG. 16, for limiting a rate of tilt of the proprotor, such as in the event of actuator failure. The system 1602 can be implemented in an aircraft with a tiltable proprotor instead of, or in addition to, redundant actuators and/or a joint assembly including a fail-safe latch as described below.

The damper 1625 of system 1602 is connected between a fixed frame 1620 of a boom 1605 of an aircraft, such as aircraft 100 of FIGS. 1 and 2, and the proprotor frame 1622, to which a proprotor (not shown) mounts. An actuator 1606 may also be connected between the fixed frame 1620 and the proprotor frame 1622 and drives the tilting of the proprotor about the rotation axis 1601. In one or more examples, the actuator 1605 can be a linear actuator. The damper 1625 and actuator 1606 can both be rotatably connected to a fixed frame 1620 of the boom 1605 and rotatably connected to the proprotor frame 1622 such that the proprotor frame (and proprotor) can rotate relative to the damper 1625 and actuator 1606.

As with the dampers 1325 and 1425, if the actuator 1606 were to become disconnected from the proprotor frame 1622

(e.g., by a break in the actuator shaft) catastrophic failure may occur, as the proprotor could begin rapidly tilting without control. In one or more examples, the system 1602 could include a second (redundant) actuator that is also connected to the proprotor frame 1622 such that if the first actuator 1606 becomes disconnected, the second actuator can nonetheless control the tilting of the proprotor about the rotation axis 1601. However, as noted throughout, adding a second actuator may complicate the system 1602, increase cost, and add more weight to the aircraft. Rather than implementing a second actuator, the system 1602 instead includes a damper mechanism such as damper 1625. In the event that the actuator 1606 becomes disconnected from the proprotor frame 1622, the damper 1625 dissipates energy and, thereby, limits the rate of change of tilt of the proprotor (e.g., as described above via a damping fluid exerting a force on the damper piston), which eliminates the catastrophic result of the actuator 1606 disconnecting from the proprotor frame 1622.

Similarly to damper 1325, 1425, and 1525, the damper 1625 can be rotatably connected to a pin (not shown) extending between two sides of a clevis bracket 1609 fixedly attached to the proprotor frame, 1622. If the actuator 1606 were to become disconnected from the proprotor frame 1622, the damper 1625 would exert a compressive force on the proprotor frame 1622 via the clevis bracket 1609 as the proprotor frame 1622 (and proprotor) tilts toward the forward flight position and a tensile force on the proprotor frame 1622 via the clevis bracket 1609 as the proprotor frame 1622 (and proprotor) tilts toward the lift position. Thus, the damper 1625 dissipates energy by exerting a force in the opposite direction of the direction of tilt of the proprotor.

The damper 1625 may be configured to handle a maximum operating pressure of between 2000 psi and 4000 psi. In some examples, the maximum operating pressure of the damper 1625 may be approximately 3000 psi. The outer diameter of the cylinder 1616 of damper 1625 may be between 1.0 and 2.5 inches. In some examples, the outer diameter of damper 1625 may be approximately 2.0 inches. The piston diameter 1607 of the damper 1625 may be between 0.25 inches and 0.75 inches. In some examples, the diameter of the piston 1607 may be approximately 0.5 inches. The normal operating stroke of the damper 1625 may be between 3 inches and 6 inches. In some examples, the normal operating stroke of the damper 1625 may be approximately 4.65 inches. The pin-to-pin range of the normal operating stroke of damper 1625 may be between 9 inches and 16 inches. In some examples, the pin-to-pin range of the normal operating stroke of damper 1625 may be between 9.9 inches and 14.6 inches. The mechanical stroke of the damper 1625 may be between 3 and 6 inches. In some examples, the mechanical stroke of the damper 1625 may be a minimum of approximately 5.06 inches. The pin-to-pin range of the mechanical stroke may be between 9 and 15 inches. In some examples, the pin-to-pin range of the mechanical stroke may be between 7.7 and 14.8 inches.

In one or more examples, the damper (e.g., damper 1325, 1425, 1525, or 1625) may be configured to generate the worst-case scenario hinge moment at less than maximum allowable impact speed at an end stop of the aircraft, such as end stop 1548 shown in FIG. 15, which is a component configured to be impacted by a tiltable component such as a proprotor at the maximum degree of tilt in each direction, of the aircraft, as described further below. In some examples, the worst-case hinge moment at maximum allowable impact speed may be between 2500 lbf and 3000 lbf at a damper piston linear rate of approximately 12 inches per second. As such, the damper may be configured provide varying amounts of force depending on the rate of linear extension or retraction of the actuator for tilting the tiltable proprotor during normal operation.

Figure 17:
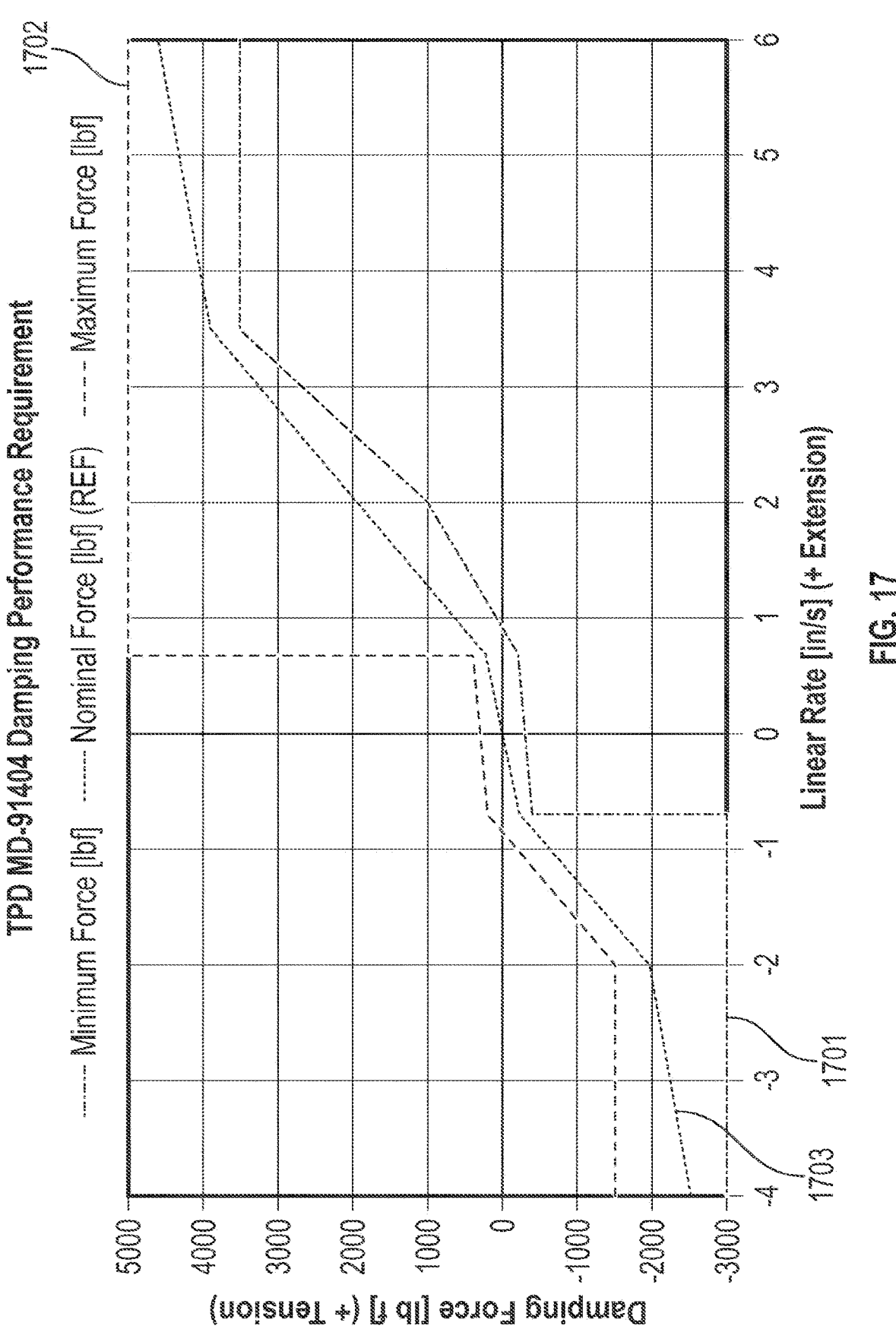
FIG. 17 shows a graph of examples of damping force as a function of a linear rate of the damper piston, according to one or more examples of the disclosure.

An exemplary graph showing the damping force of a damper using TPD MD-914-04 damping fluid at various rates of linear extension and retraction is shown in FIG. 17. The linear rate of the exemplary damper, which is provided on the X-axis of the graph of FIG. 17, is the rate of extension or retraction of an exemplary damper piston, for instance the piston any of dampers 1325, 1425, 1525, and 1625. The positive values of the X-axis indicate extension of the damper piston (e.g. damper piston 1318 or 1418), and the negative values of the X-axis indicate retraction of the damper piston. As an actuator (e.g., actuator 1306 or 1406) configured to tilt a proprotor (e.g. proprotor 203 of FIG. 2) tilts the proprotor toward the lift configuration (or in the case of an actuator shaft breakage, the proprotor tilts in an uncontrolled manner toward the lift configuration), the damper exerts a force acting in tension on the proprotor in proportion to the piston velocity. Alternatively, as the actuator tilts the proprotor toward the forward flight configuration (or, again, in the case of an actuator shaft breakage, the proprotor tilts in an uncontrolled manner toward the lift configuration), the damper exerts a compressive force on the proprotor. As such, the damper will exert a force in the opposite direction of the direction of proprotor tilt while the proprotor is tilting.

FIG. 17 includes three different lines 1701-1703 indicating three different relationships between the linear rate of extension or retraction of the damper piston and the damping force. Line 1701 indicates a lower threshold of damping force at various linear rates, line 1702 indicates a nominal damping force at various linear rates for an exemplary damper, and line 1703 indicates a upper threshold of damping force at various linear rates. As shown in FIG. 17, an exemplary damper can be configured to maintain less than 400 lbf damper force at an actuator extension and retraction rate of +/−0.68 inches per second to minimize loss into the actuator. The exemplary damper using MIL-PRF-87257 damping fluid depicted in FIG. 17 is configured to handle a limit load of 5000 lbf in extension and 3000 lbf in retraction.

The selection of a damper for damping high velocity tilting of a tiltable proprotor in the event of actuator disconnect may be based at least in part on characteristics of the proprotor. According to some examples, the tiltable proprotors disclosed herein can have a mass moment of inertia of between 5 and 10 kilograms per square meter. An exemplary proprotor having a mass moment of inertia of approximately 6.7 kilograms per square meter was used to determine upper and lower bounds of rotational energy of the proprotor upon impact with an end stop of the aircraft during uncontrolled tilting of the tiltable proprotor, as described below.

According to some examples, the rotational energy of a tiltable proprotor during uncontrolled rotation may be between 0 J and 1000 J at impact with an end stop of the aircraft. A lower limit of rotational energy may be between 0 J and 300 J, and an upper limit of rotational energy may be between 700 J and 1000 J. The lower limit may include instances in which the actuator becomes disconnected and the tiltable proprotor impacts an end stop of the aircraft at a coasting velocity after minimal acceleration (e.g., between 0 milliseconds and 100 milliseconds of acceleration). The upper limit may include instances in which the actuator becomes disconnected and the tiltable proprotor accelerates after disconnect until impacting an end stop of the aircraft.

In some examples, uncontrolled tilting of the tiltable proprotor due to actuator disconnection can result in a tiltable proprotor impacting an end stop of the aircraft at between 500 and 1000 degrees per second. According to some examples, the acceptable impact rate for a tiltable proprotor impacting an end stop of the aircraft is between 150 degrees per second and 200 degrees per second, well below the 500 and 1000 degrees per second experienced during uncontrolled tilting. In some examples, the allowable impact rate may be less than 100 degrees per second. As such the passive dampers provided herein can be configured to reduce the impact rate of a tiltable proprotor in the event of actuator disconnection by preventing the proprotors from accelerating to beyond the acceptable rate of impact. The passive dampers may be configured to reduce the impact rate to less than 200 degrees per second, less than 150 degrees per second, less than 100 degrees per second, less than 50 degrees per second, or less than 20 degrees per second, according to various requirements of the aircraft. The rate at which an actuator must be able to tilt the tiltable proprotor between the lift position and the forward flight position during normal operation may influence the amount by which a damper is configured to reduce the proprotor's angular rate. In some examples, the actuator is configured to tilt the tiltable proprotor between the lift position and the forward flight position at a maximum of between 5 and 30 degrees per second. In some examples, the actuator is configured to tilt the tiltable proprotor between the lift position and the forward flight position at a maximum of 15 degrees per second. In some examples, the actuator is configured to tilt the tiltable proprotor at a maximum of 15 degrees per second in hover (i.e., when stabilizing adjustments are made to the proprotor tilt angle while the proprotor is in a lift/hover configuration during normal operation), and at a maximum of 8 degrees per second in transition (i.e., while the proprotor is transitioning between the forward flight configuration and the lift/hover configuration during normal operation).

Results of an exemplary tiltable proprotor disconnect simulation analysis are shown in FIGS. 18A-18D. It should be understood that the results of the simulation depicted in FIGS. 18A-18D are only meant to provide illustrative performance data of an exemplary passive damping system. The results of the tiltable proprotor disconnect simulation analysis should not be construed as limiting as one skilled in the art would understand that many different passive dampers could be configured to dampen a tilting velocity of the tiltable proprotors described herein without deviating from the scope of the claims.

Figure 18A:
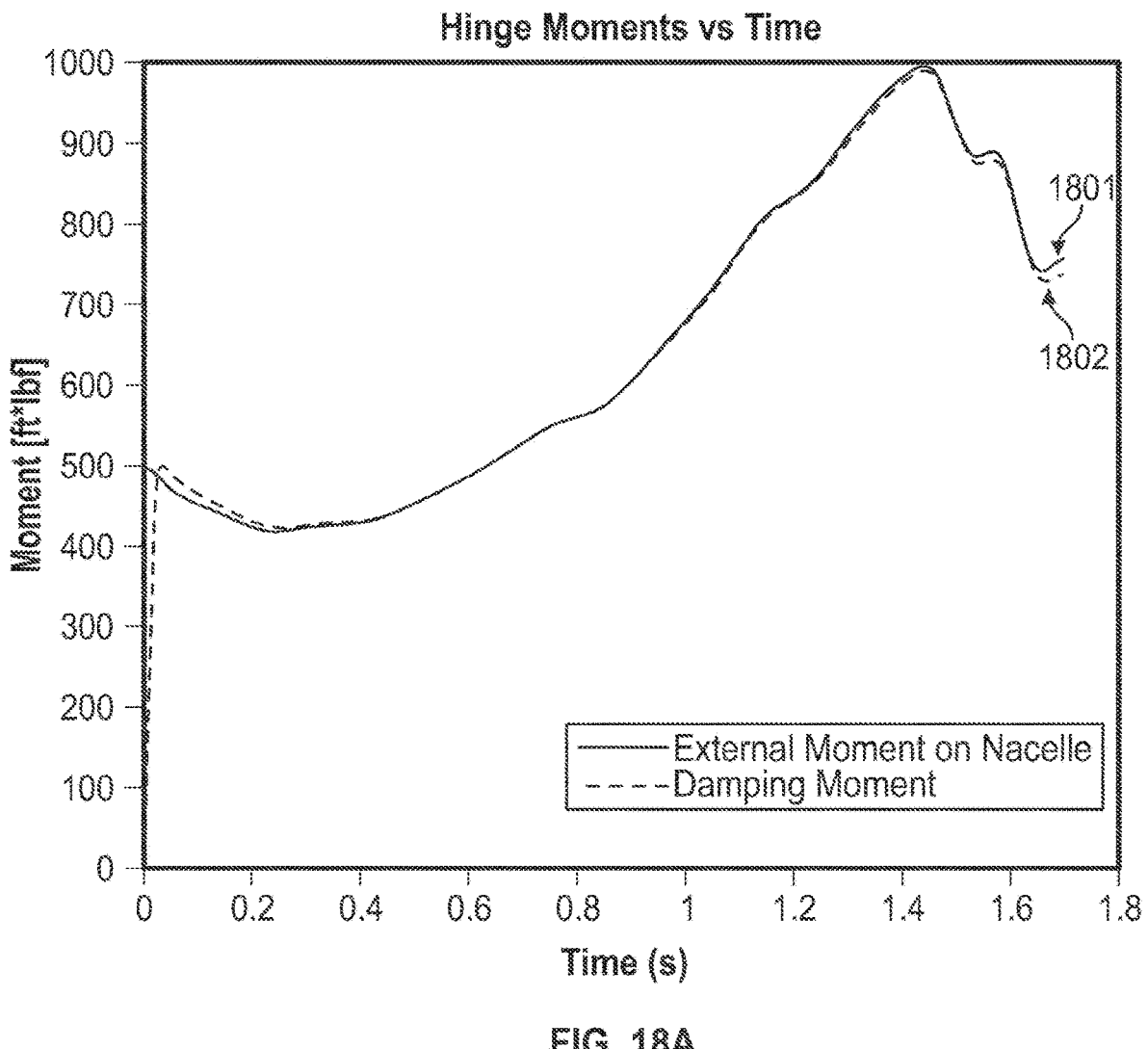
FIG. 18A shows a graph of proprotor and damping hinge moments as a function of time, according to one or more examples of the disclosure.

FIG. 18A depicts both the external hinge moment acting on the proprotor and the damping hinge moment as a function of time beginning approximately at the moment of actuator disconnect. The hinge moment, which is provided on the Y-axis of the graph of FIG. 18A, is the moment acting about the axis of rotation of the proprotor about a joint connecting the proprotor to the aircraft 100. The rotational axis of the proprotor is shown in the example of FIG. 13, as rotational axis 1301. FIG. 18A includes two lines, line 1801 and 1802. Line 1801 represents the hinge moment of the proprotor and line 1802 illustrates the hinge moment of the damper. As illustrated, the hinge moment of the damper can closely track the hinge moment of the proprotor. Within 200 milliseconds of actuator disconnect, the hinge moment of both the proprotor and the damper can increase to between 400 ft-lbf and 600 ft-lbf. The hinge moment may then briefly decrease, as shown, before rising to a maximum value of between 800 ft-lbf and 1000 ft-lbf between one and two seconds after actuator disconnect.

Figure 18B:
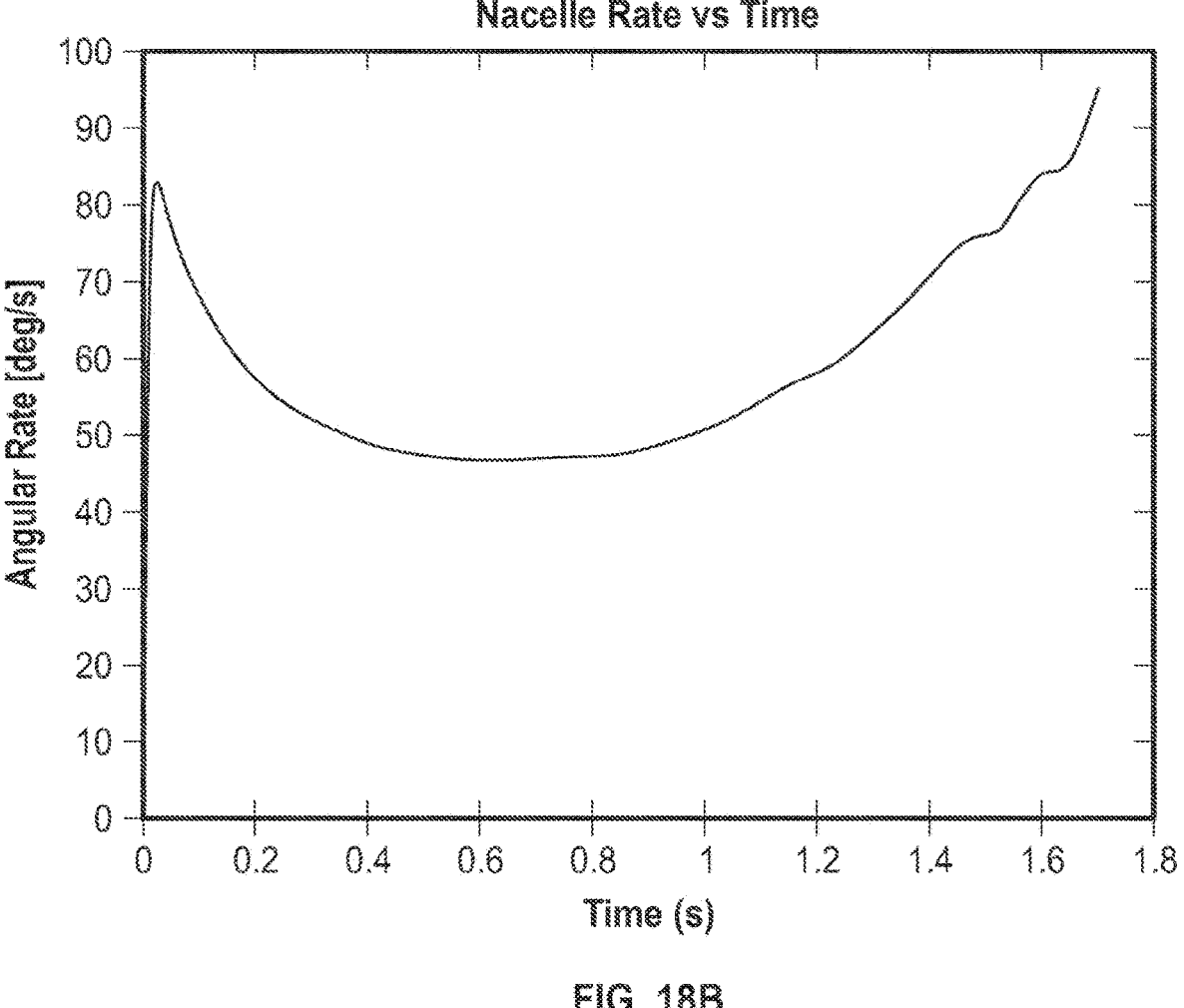
FIG. 18B shows a graph of proprotor angular rate as a function of time, according to one or more examples of the disclosure.

FIG. 18B depicts a plot of the proprotor angular velocity as a function of time beginning approximately at the moment of actuator disconnect. The angular rate, which is provided on the Y-axis of the graph of FIG. 18B, is the angular velocity of the proprotor rotating about the axis of rotation of the proprotor. The rotational axis of the proprotor is shown in the example of FIG. 13, as rotational axis 1301. The angular rate depicted on the Y-axis is the angular rate of the proprotor after actuator disconnect acting under the influence of a damping force, for instance provided by a passive damper such as damper 1325, 1425, 1525, or 1625. As shown, the angular rate of the proprotor after actuator disconnect can be configured to remain below an impact rate of 100 degrees per second when the angular rate is controlled by the damper, for instance damper 1325, 1425, 1525, or 1625.

Figure 18C:
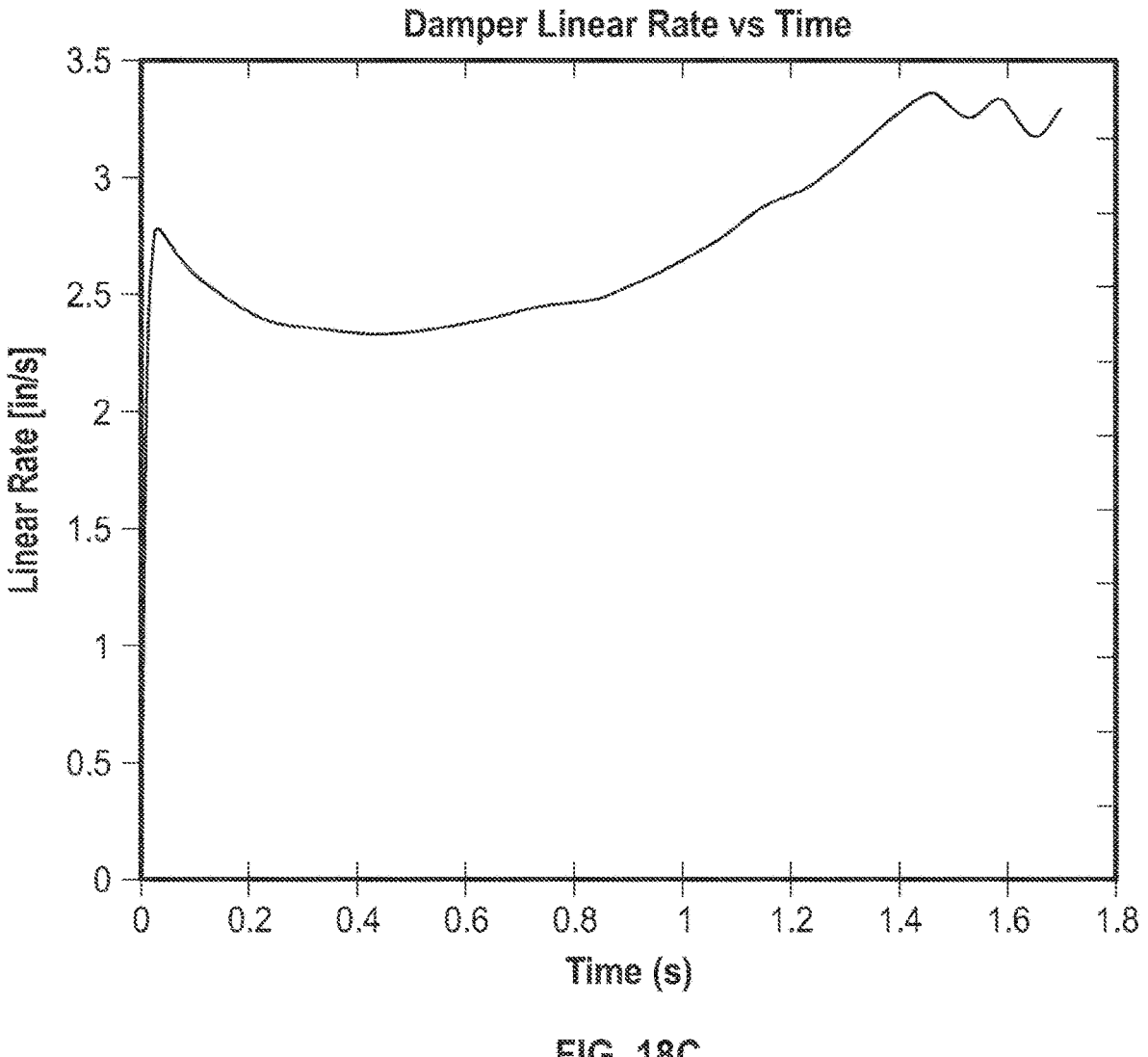
FIG. 18C shows a graph of a linear rate of a damper piston as a function of time, according to one or more examples of the disclosure.

FIG. 18C depicts a plot of the linear velocity of the damper piston as a function of time beginning approximately at the moment of actuator disconnect. The linear velocity, which is provided on the Y-axis of the graph of FIG. 18C, is the linear velocity of an exemplary damper piston (e.g., of damper 1325 or 1425) traveling along the axis of extension and retraction of the damper. The approximate axis of extension and retraction of the damper is shown as axis 1311 and 1411 in FIGS. 13 and 14. As shown, shortly after actuator disconnect (within 200 milliseconds), the damper piston can reach a linear velocity of between 2 inches per second and 3 inches per second. Within the first two seconds following actuator disconnect, the damper piston linear velocity can fluctuate between 2.0 and 3.5 inches per second.

Figure 18D:
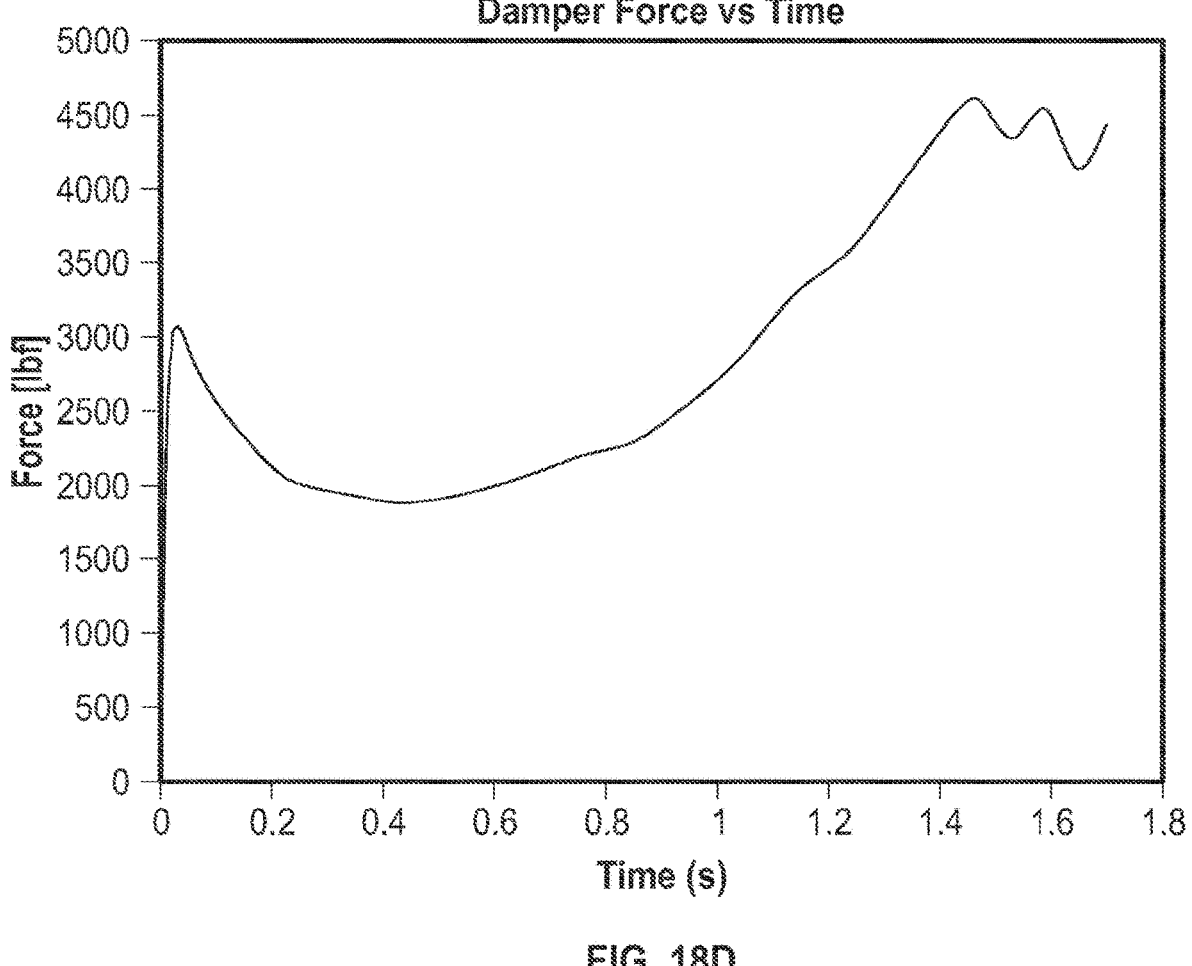
FIG. 18D shows a graph of damper force as a function of time, according to one or more examples of the disclosure.

FIG. 18D depicts a plot of the damper force as a function of time beginning approximately at the moment of actuator disconnect. The damper force, which is provided on the Y-axis of the graph of FIG. 18D, is the force acting against the rotation of the proprotor following actuator disconnect. As shown, shortly after actuator disconnect (within 200 milliseconds), the damper force can reach an initial peak of between 2500 lbf and 3500 lbf. Within the first two seconds following actuator disconnect, the damper force can fluctuate between 1500 lbf and 5000 lbf.

Figure 19:
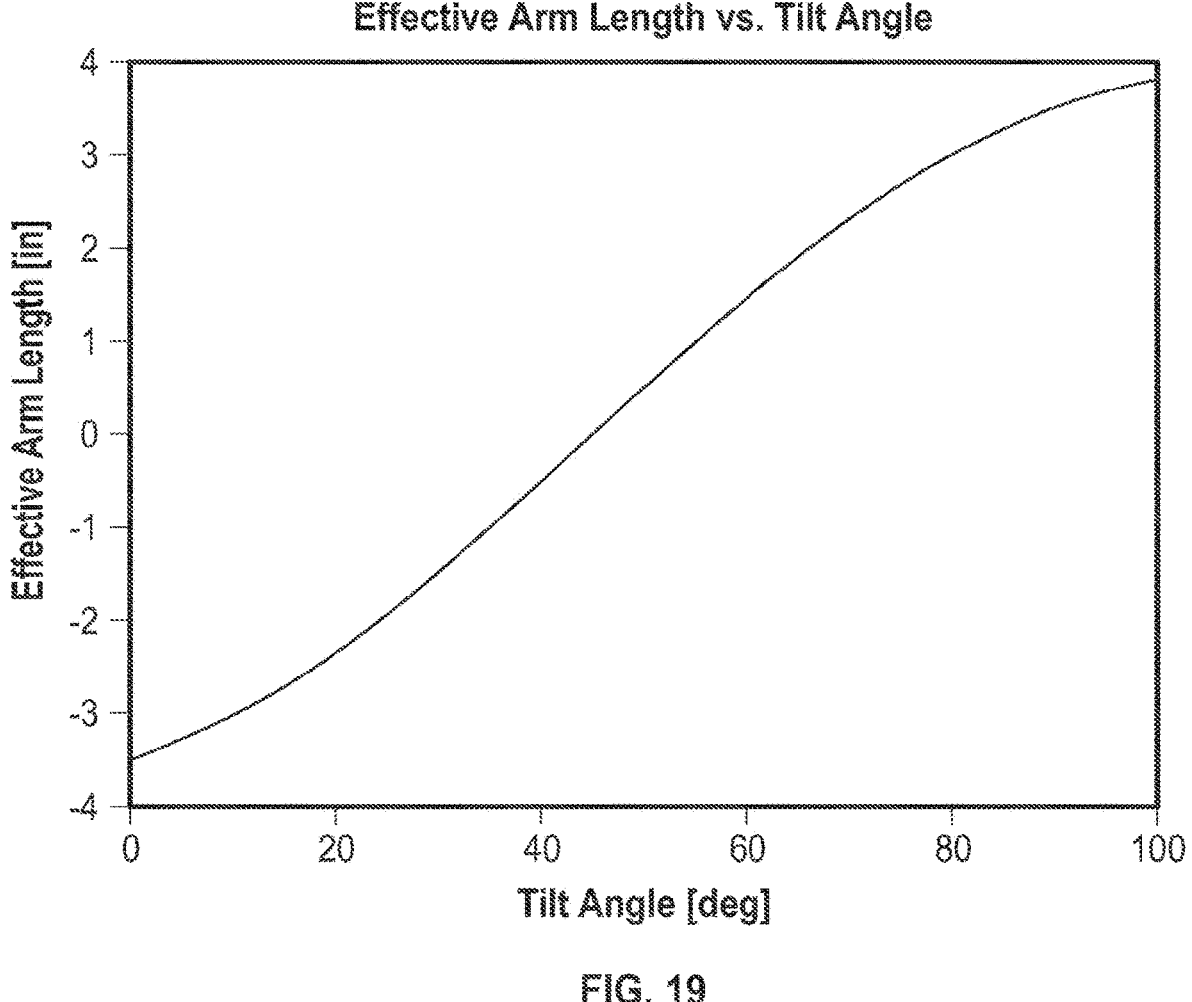
FIG. 19 shows a graph of an exemplary damper effective moment arm length as a function of the proprotor tilt angle for a first damper configuration, according to one or more examples of the disclosure.
Figure 20:
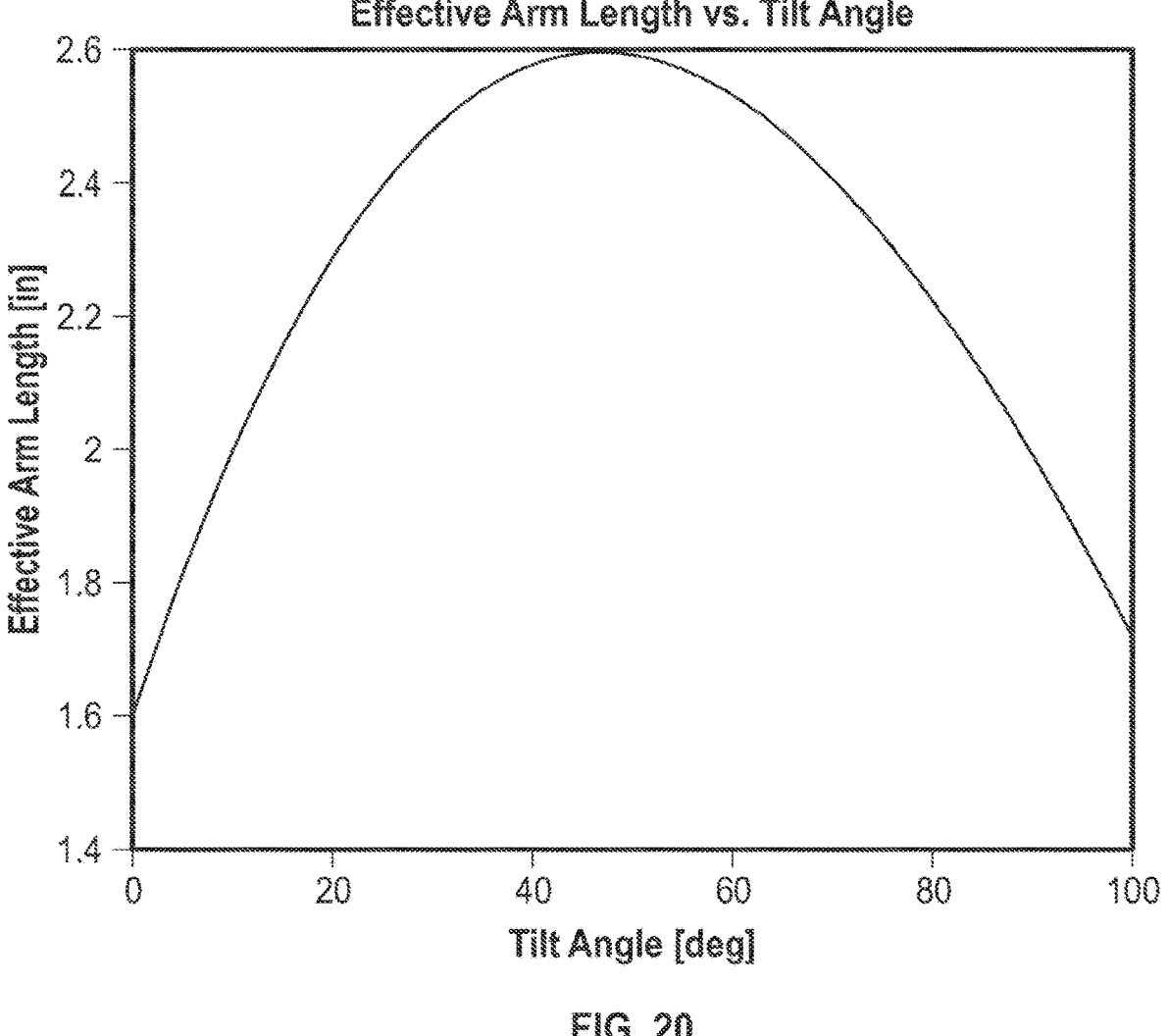
FIG. 20 shows a graph of an exemplary damper effective moment arm length as a function of the proprotor tilt angle for a second damper configuration, according to one or more examples of the disclosure.

FIGS. 19 and 20 illustrate plots of exemplary damper effective moment arm length as a function of the proprotor tilt angle. The exemplary damper of FIG. 19 is mounted in a first exemplary configuration and the exemplary damper of FIG. 20 is mounted in a second exemplary configuration. The effective moment arm length of the exemplary damper mounted in the first configuration, which is provided on the Y-axis of the graph of FIG. 19, is the moment arm of the damper at various tilt angles of the tiltable proprotor between 0 degrees and 100 degrees. The effective moment arm length of the exemplary damper mounted in the second exemplary configuration, which is provided on the Y-axis of the graph of FIG. 20, is the moment arm of the damper at various tilt angles of the tiltable proprotor between 0 degrees and 100 degrees. As shown in FIGS. 19 and 20, the mounting configuration of the damper with respect to the proprotor can impact the effective moment arm of the damper as the proprotor tilts to different tilt angles.

Figure 21:
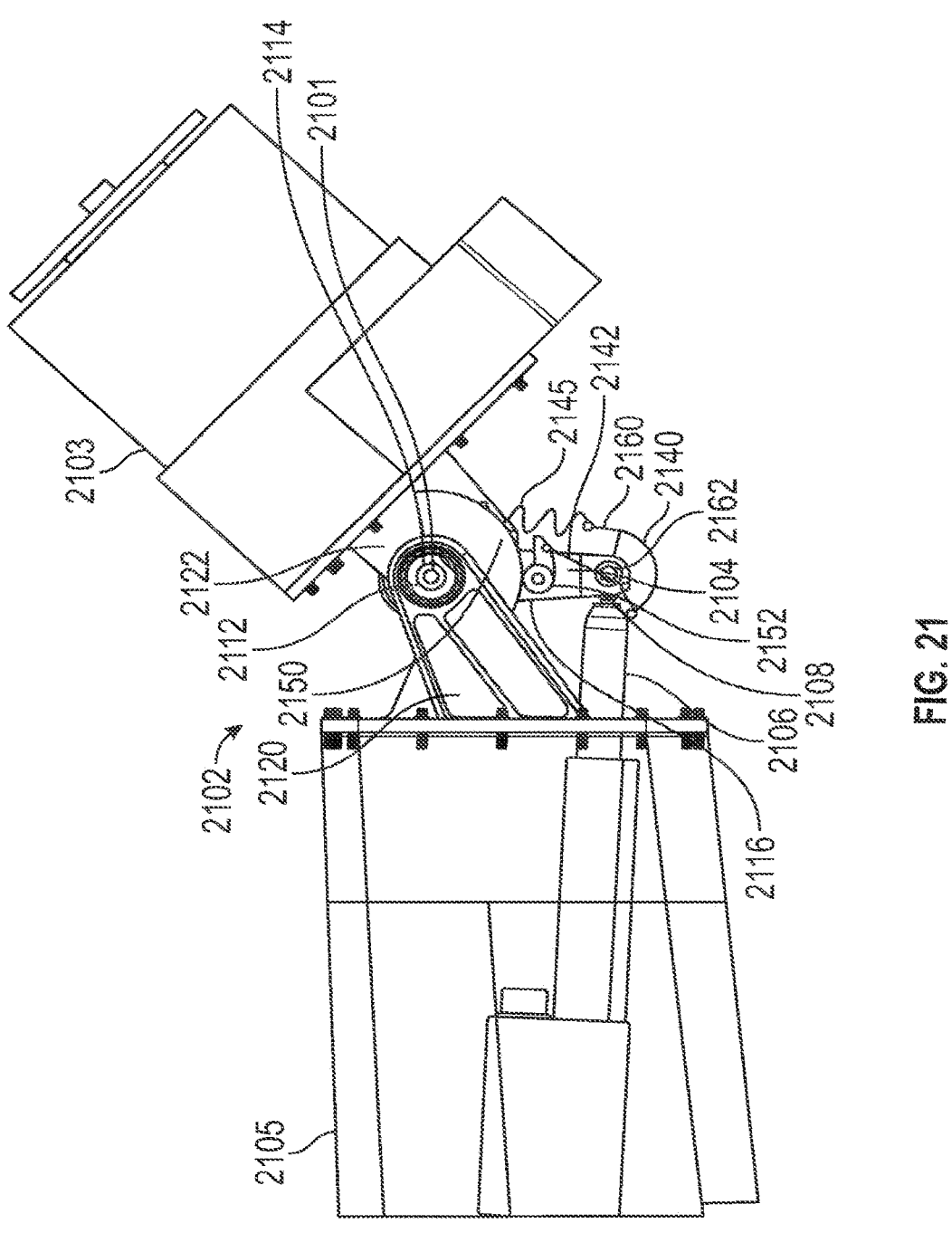
FIG. 21 shows a side view of an exemplary system in a first configuration, according to one or more examples of the disclosure.

In one or more examples, any of the systems described above, such as system 202, system 302, system 402, system 502, system 1302, system 1402, and aircraft 100 can include a tilt rotor lock mechanism, as shown in the exemplary system 2102 of FIG. 21, which shows a side view of the system 2102 in a first configuration, according to one or more examples of the disclosure. The system 2102 can be implemented in an aircraft with a tiltable proprotor instead of, or in addition to, redundant actuators and/or a damper mechanism, and can lock the tilt of the proprotor in place.

The system 2102 is positioned between a boom 2105 and proprotor 2103 of an aircraft, and can include a tension spring 2145 connected to a pulley 2140 via connector 2160, with the pulley 2140 also connected via connector 2142 to a pawl 2152. The pawl 2152 can be selectively engaged with a sector gear 2150 based on movement of the pulley 2140, with the pawl 2152 configured to move towards the sector gear 2150 as the pulley 2140 moves away from the actuator 2106. The pulley 2140 is coupled to the actuator 2106 in normal operation.

Figure 22:
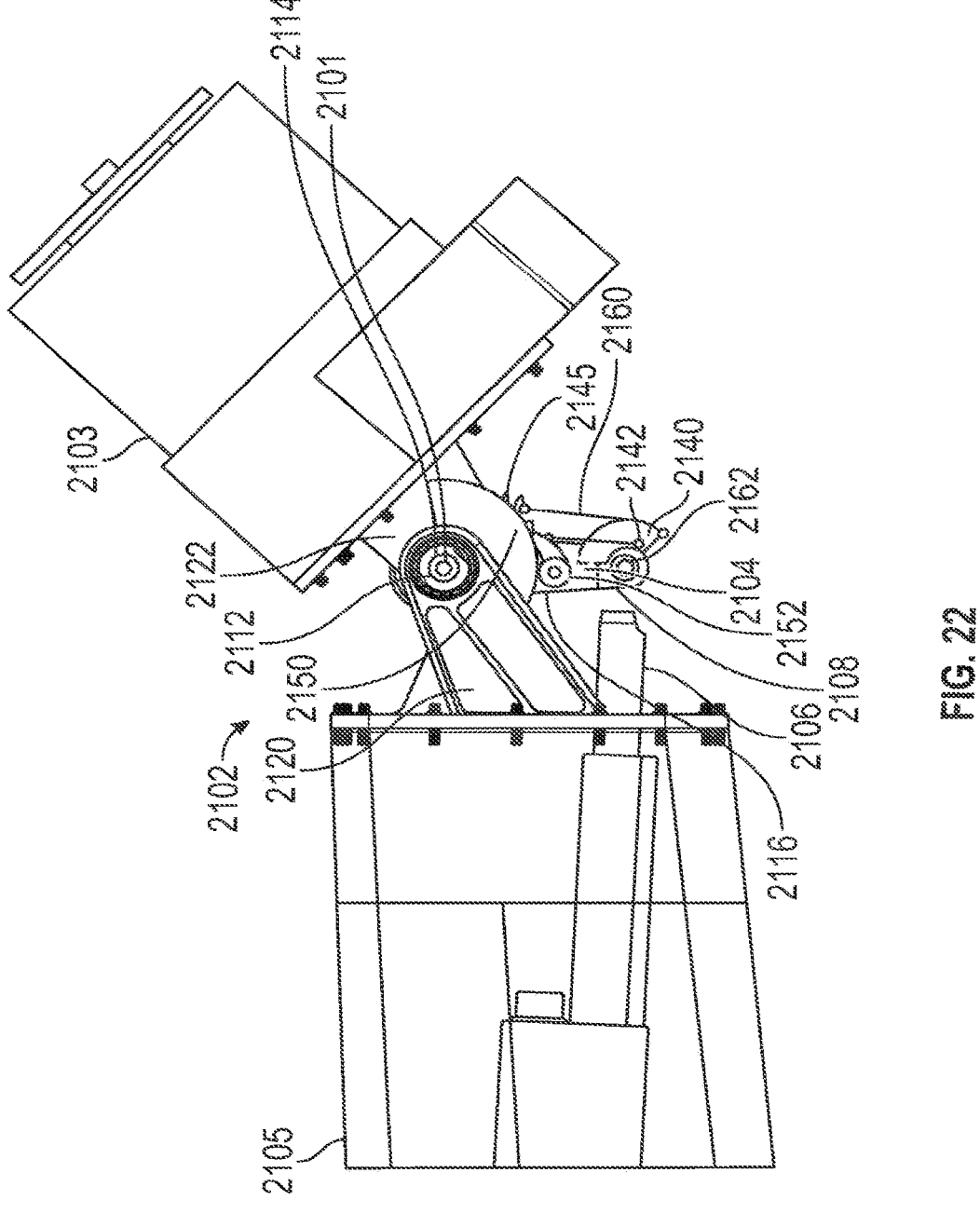
FIG. 22 shows the exemplary system of FIG. 15 in a second configuration, according to one or more examples of the disclosure.
Figure 23:
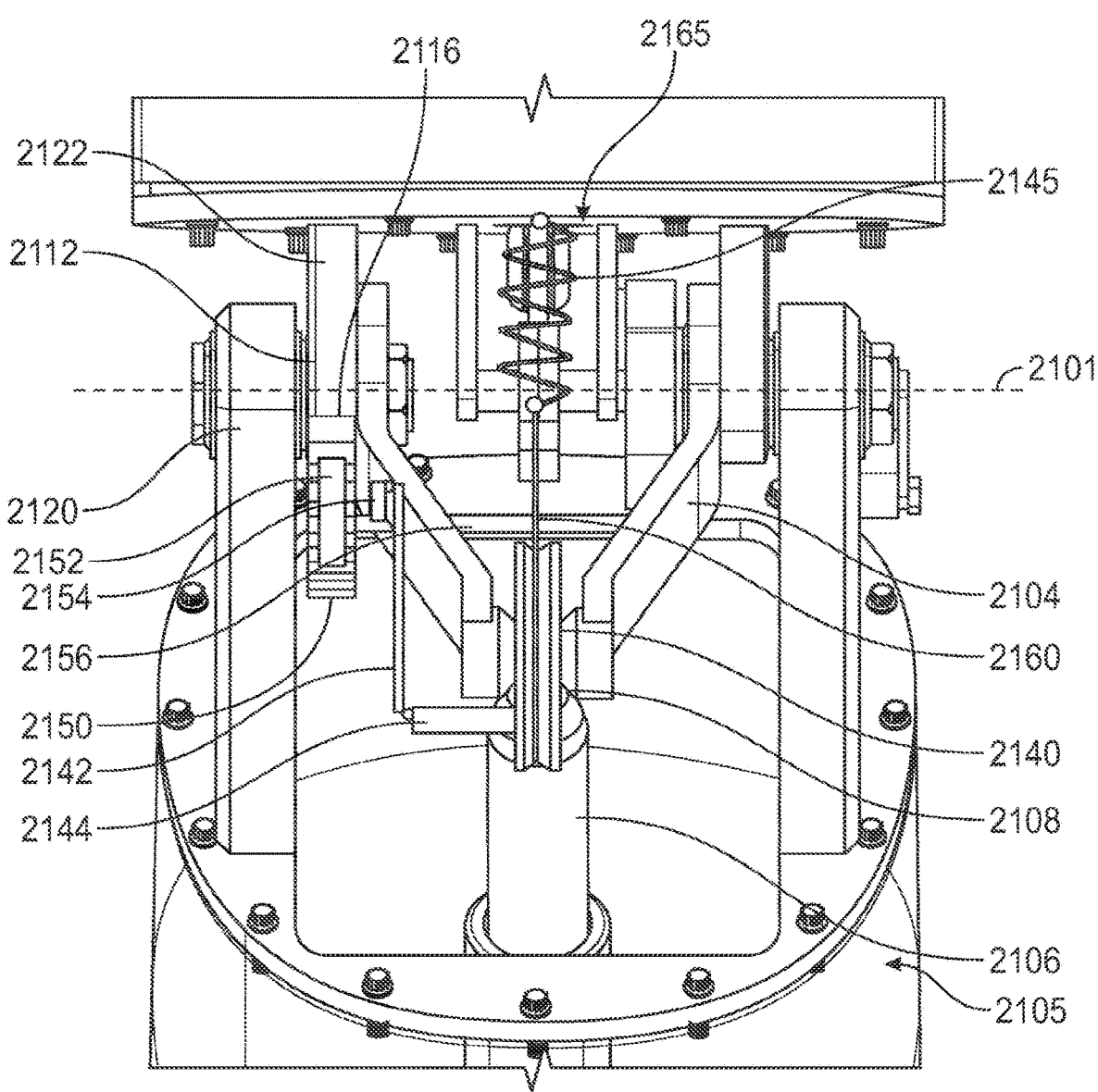
FIG. 23 shows a front view of the exemplary system of FIG. 15, according to one or more examples of the disclosure.

In the event that the actuator 2106 and the pulley 2140 become disconnected (e.g., the actuator 2106 becomes disconnected from the proprotor 2103), the pulley 2140 moves away from the actuator 2106 because of the bias from the spring 2145, as shown in the configuration of system 2102 shown in FIG. 22. Whereas the FIG. 21 shows the pawl 2152 not engaged with the sector gear 2150 and the pulley 2140 located adjacent to the actuator 2106, FIG. 22 shows the pawl 2152 engaged with the sector gear 2150 and the pulley 2140 no longer located adjacent to the actuator 2106. The tension spring 2145 can automatically draw the pulley 2140 away from the actuator 2106 in the event that the actuator 2106 and pulley 2140 become disconnected, thereby forcing the pawl 2152 to engage the sector gear 2150. When the pawl 2152 engages the sector gear 2150, the proprotor can be prevented from tilting further in one or both directions. By preventing further tilting in one or both directions, the system 2102 can prevent catastrophic failure from occurring should the actuator become disconnected from the proprotor without requiring redundant actuators or damping mechanisms. FIG. 23 shows a front view of the exemplary system of FIG. 21, according to one or more examples of the disclosure.

Figure 24A:
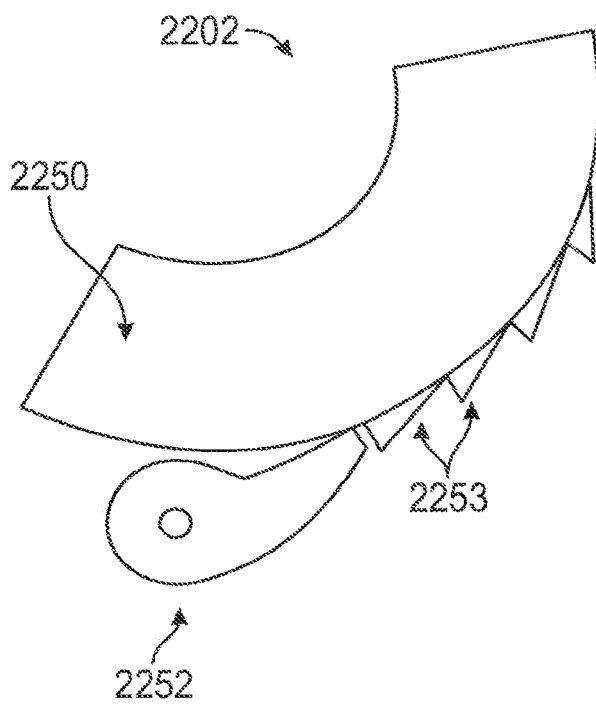
FIG. 24A shows an exemplary ratchet configuration and FIG. 24B shows an exemplary lock configuration for locking a proprotor in at least one direction.

In one or more examples, the sector gear 2250 can be a ratchet with ridges that contact the pawl 2252. Such exemplary configurations are shown in FIG. 24A, which shows an exemplary ratchet configuration 2202, according to one or more examples of the disclosure. The ratchet configuration 2202 includes a sector gear 2250 that has a number of ridges 2253 that have a sloped side and a straighter side. The pawl 2252 rides over the sloped sides but catches on the straighter sides. As such, the proprotor will be able to tilt in a first direction (e.g., permitted to tilt counterclockwise in the illustrated configuration) but not a second direction (e.g., not permitted to tilt clockwise in the illustrated configuration). This may be useful in permitted the proprotor to move to a desired failure state tilt angle, such as a lift configuration, in which the proprotor can still be used during at least a portion of the flight. Such a ratchet mechanism could also be used with any of the damper configurations described above to provide a slower rate of tilt in the ratcheting direction.

Figure 24B:
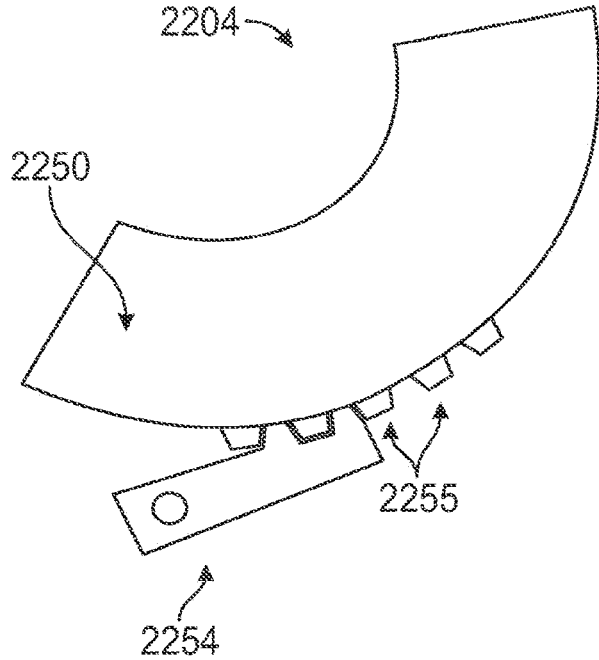

Alternatively, the sector gear and pawl can be configured to lock the proprotor in both directions. FIG. 24B illustrates an exemplary lock configuration 2204 that has a sector gear 2250 that has a number of ridges 2255 that have two straight sides and a locking mechanism 2254 that engages the ridges 2255. When the locking mechanism 2254 is forced against the gear sector 2250, the locking mechanism will engage with the ridges 2255. The locking mechanism 2254 will be unable to ride past the ridges 2255 in either direction because of their straight sides, locking the sector gear 2250 (and, thereby, the proprotor) in position.

Accordingly, described herein are systems and methods for mechanically linking the tilt of a proprotor of an aircraft with the pitch of blades of the proprotor. The systems enable blade pitch to be tailored to the different operational regimes of the proprotor while avoiding the need for dedicated blade pitch adjustment actuators and the cost, weight, and failure points associated with such dedicated blade adjustment actuators.

Figure 25:
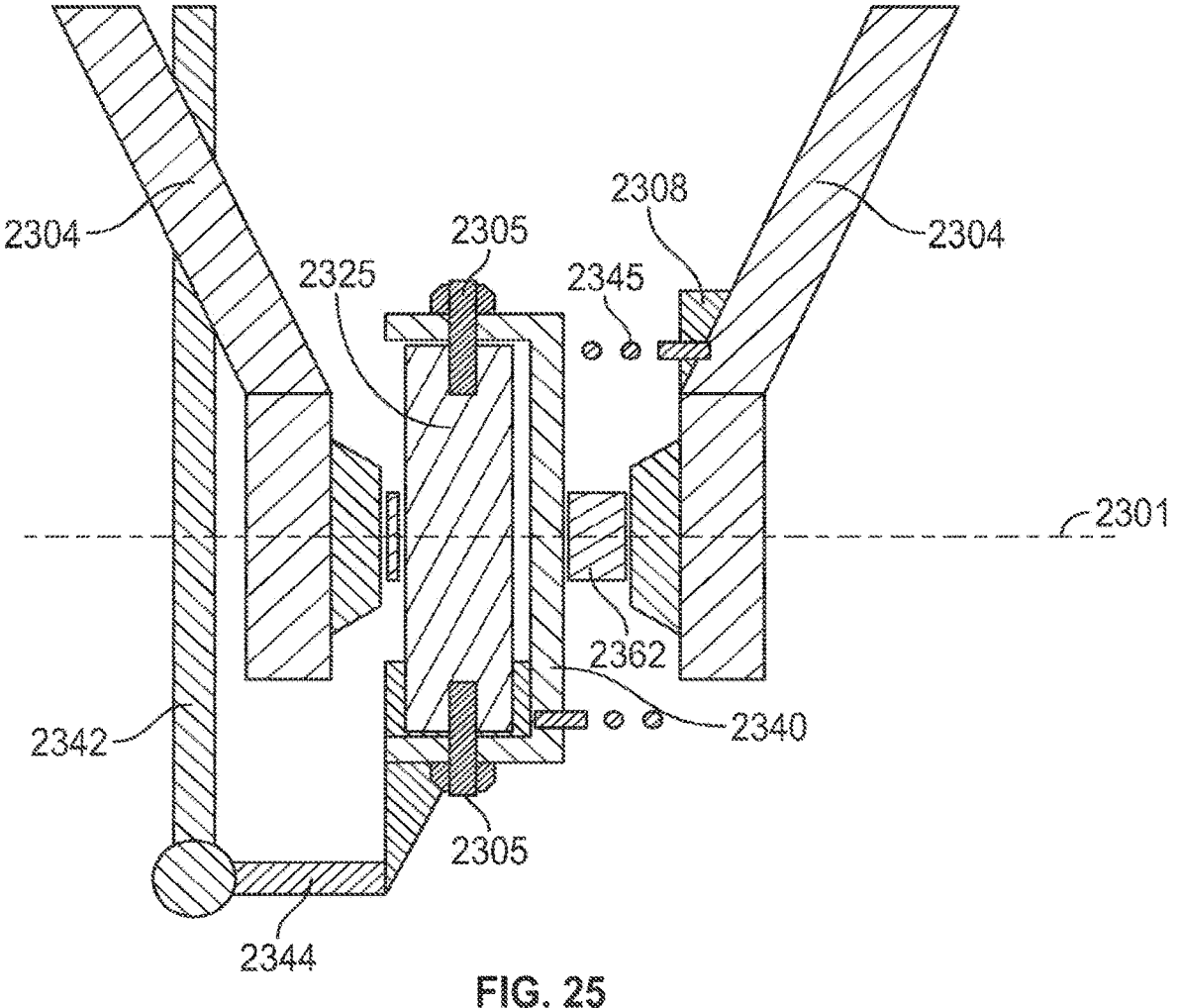
FIG. 25 shows a front view of an exemplary system, according to one or more examples of the disclosure.

FIG. 25 illustrates an alternative spring configuration and a feature for providing a "mid-life" check capability to ensure that the pawl mechanism is not jammed.

The foregoing description, for the purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the techniques and their practical applications. Others skilled in the art are thereby enabled to best utilize the techniques and various examples with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The invention claimed is:

1. A tilting apparatus for an aircraft, comprising:
a tiltable aircraft component which tilts between a first and second position;
at least one actuator for adjusting a tilt angle of the tiltable aircraft component; and
at least one passive damper connected to the tiltable aircraft component and configured to limit a rate of change of the tilt angle of the tiltable aircraft component, and
wherein the at least one passive damper is connected to the tiltable aircraft component on a first load path and the at least one actuator is connected to the tiltable aircraft component on a second load path separate from the first load path of the at least one passive damper.

2. The tilting apparatus of claim 1, wherein the tiltable aircraft component comprises a proprotor.

3. The tilting apparatus of claim 1, wherein the tiltable aircraft component comprises a proprotor frame.

4. The tilting apparatus of claim 1, wherein the at least one passive damper is configured to limit the rate of change of the tilt angle of the tiltable aircraft component in both tilt directions.

5. The tilting apparatus of claim 1, wherein the at least one passive damper comprises a hydraulic or pneumatic cylinder.

6. The tilting apparatus of claim 5, wherein the hydraulic or pneumatic cylinder is a balanced uncharged cylinder or an unbalanced cylinder.

7. The tilting apparatus of claim 1, wherein the at least one actuator comprises a linear actuator or a rotary actuator.

8. The tilting apparatus of claim 1, wherein the tiltable aircraft component is configured to be tiltably mounted to a boom.

9. The tilting apparatus of claim 1, wherein the at least one passive damper is at least partially housed within an outer shell.

10. The tilting apparatus of claim 1, wherein the at least one actuator and the at least one passive damper are configured to be positioned on opposite sides of a rib of an aircraft.

11. The tilting apparatus of claim 1, wherein the tiltable aircraft component is configured to tilt in an upward direction from a forward flight position to a lift position, and a force vector of the at least one passive damper extends beneath a tilt axis of the tiltable aircraft component.

12. The tilting apparatus of claim 1, wherein a range of the tilt angle of the tiltable aircraft component is at least 90 degrees.

13. The tilting apparatus of claim 1, further comprising a single actuator for adjusting the tilt angle of the tiltable aircraft component.

14. The tilting apparatus of claim 1, wherein the at least one passive damper is configured to limit the rate of change of the tilt angle to a predetermined threshold value in an event in which the tiltable aircraft component is disconnected from the at least one actuator during forward flight.

15. The tilting apparatus of claim 1, wherein the first position is a lift position for providing lift to the aircraft; and wherein the second position is a forward thrust position for providing forward thrust to the aircraft.

16. The tilting apparatus of claim 1, wherein the tiltable aircraft component is electrically powered.

17. An aircraft, comprising:
a wing;
a boom mounted to the wing;
at least one tiltable aircraft component mounted to the boom, which tilts between a first and second position;
at least one actuator for adjusting a tilt angle of the at least one tiltable aircraft component; and
at least one passive damper connected to the at least one tiltable-aircraft component and configured to limit a rate of change of the tilt angle of the at least one tiltable aircraft component, and
wherein the at least one passive damper is on a load path separate from a load path of the at least one actuator.

18. The aircraft of claim 17, wherein the at least one tiltable aircraft component is mounted to a forward end of the boom.

19. The aircraft of claim 17, wherein the boom is mounted inward of the end of the wing.

20. The aircraft of claim 17, wherein the at least one tiltable component comprises a plurality of tiltable components; and
wherein the at least one passive damper comprises a plurality of dampers.

21. The aircraft of claim 17, wherein the aircraft is a passenger aircraft.

22. A method for controlling a tiltable component of an aircraft, comprising:
receiving a command at a controller to adjust a tilt angle of a tiltable aircraft component between a first and second position;
controlling at least one actuator to adjust the tilt angle of the tiltable aircraft component; and
wherein at least one passive damper is connected to the tiltable aircraft component and limits a rate of change of the tilt angle of the tiltable aircraft component, and
wherein the at least one passive damper is connected to the tiltable aircraft component on a first load path and the at least one actuator is connected to the tiltable aircraft component on a second load path separate from the first load path of the at least one passive damper.

23. The method of claim 22, wherein the tiltable aircraft component comprises a proprotor.

24. The method of claim 22, wherein the at least one passive damper is configured to limit the rate of change of the tilt angle of the tiltable aircraft component in both tilt directions.

25. The method of claim 22, wherein the at least one passive damper comprises a hydraulic or pneumatic cylinder.

26. The method of claim 22, wherein the at least one actuator and the at least one passive damper are configured to be positioned on opposite sides of a rib of an aircraft.

27. The method of claim 22, wherein the tiltable aircraft component is configured to tilt in an upward direction from a forward flight position to a lift position, and a force vector of the at least one passive damper extends beneath a tilt axis of the tiltable aircraft component.

28. The method of claim 22, wherein a range of the tilt angle of the tiltable aircraft component is at least 90 degrees.

29. The method of claim 22, wherein the at least one passive damper is configured to limit the rate of change of the tilt angle to a predetermined threshold value in an event in which the tiltable aircraft component is disconnected from the at least one actuator during forward flight.

30. The method of claim 22, wherein the first position is a lift position for providing lift to the aircraft; and wherein the second position is a forward thrust position for providing forward thrust to the aircraft.

* * * * *

30